(12) United States Patent
Chalermkraivuth et al.

(10) Patent No.: US 7,640,201 B2
(45) Date of Patent: Dec. 29, 2009

(54) METHODS AND SYSTEMS FOR ANALYTICAL-BASED MULTIFACTOR MULTIOBJECTIVE PORTFOLIO RISK OPTIMIZATION

(75) Inventors: Kete Charles Chalermkraivuth, Niskayuna, NY (US); Anindya Chakraborty, Schenectady, NY (US); Michael Craig Clark, Glen Ellyn, IL (US); Richard Paul Messmer, Rexford, NY (US)

(73) Assignee: General Electric Company, Niskayuna, NY (US)

( * ) Notice: Subject to any disclaimer, the term of this patent is extended or adjusted under 35 U.S.C. 154(b) by 1289 days.

(21) Appl. No.: 10/390,710

(22) Filed: Mar. 19, 2003

(65) Prior Publication Data

US 2004/0199448 A1    Oct. 7, 2004

(51) Int. Cl.
*G06Q 99/00* (2006.01)
(52) U.S. Cl. .................................................. 705/36
(58) Field of Classification Search ............. 705/35–40
See application file for complete search history.

(56) References Cited

U.S. PATENT DOCUMENTS

| | | | |
|---|---|---|---|
| 5,126,936 A | 6/1992 | Champion et al. |
| 5,148,365 A | 9/1992 | Dembo |
| 5,195,026 A | 3/1993 | Nonaka |
| 5,202,827 A | 4/1993 | Sober |
| 5,210,687 A | 5/1993 | Wolfberg |
| 5,347,446 A | 9/1994 | Iino |
| 5,351,184 A | 9/1994 | Lu |
| 5,550,734 A | 8/1996 | Tarter |
| 5,587,897 A | 12/1996 | Iida |
| 5,590,037 A | 12/1996 | Ryan |
| 5,659,667 A | 8/1997 | Buescher |
| 5,682,465 A | 10/1997 | Kil |
| 5,704,044 A | 12/1997 | Tarter |
| 5,732,397 A | 3/1998 | DeTorre |
| 5,784,596 A | 7/1998 | Melamed |
| 5,784,696 A | 7/1998 | Melnikoff |

(Continued)

FOREIGN PATENT DOCUMENTS

EP    0356191 A2    2/1990

(Continued)

OTHER PUBLICATIONS

Baglioni, S., et al., An Evolutionary Approach to Multiperiod Asset Allocation, Proceedings of Genetic Programming, (EuroGP'2000), vol. 1802, pp. 225-236, Springer-Verlag, Edinburgh, 2000.

(Continued)

*Primary Examiner*—Thu-Thao Havan
*Assistant Examiner*—Thomas M Hammond, III
(74) *Attorney, Agent, or Firm*—Scott J. Amus

(57) ABSTRACT

The invention provides systems and methods for determining the allocation of securities in a portfolio. The method includes providing a collection of securities in a portfolio, each security being associated with associated attributes; providing risk factor data related to the portfolio; pooling the securities into a plurality of security clusters based on the attributes associated with each security and the risk factor data, each security being assigned to an security cluster, the pooling being performed using multivariate decision tree processing; processing the security clusters using a nonlinear programming optimizer to generate optimization results; and presenting the optimization results in a risk-return space for determination of a security allocation.

10 Claims, 11 Drawing Sheets

U.S. PATENT DOCUMENTS

| | | |
|---|---|---|
| 5,799,287 A | 8/1998 | Dembo |
| 5,802,500 A | 9/1998 | Ryan |
| 5,875,437 A | 2/1999 | Atkins |
| 5,884,283 A | 3/1999 | Manos |
| 5,884,286 A | 3/1999 | Daughtery |
| 5,884,287 A | 3/1999 | Edesess |
| 5,918,217 A | 6/1999 | Maggioncalda |
| 5,926,792 A | 7/1999 | Koppes |
| 5,930,762 A | 7/1999 | Masch |
| 5,991,744 A | 11/1999 | DiCresce |
| 5,999,917 A | 12/1999 | Facciani |
| 6,003,018 A | 12/1999 | Michaud |
| 6,018,722 A | 1/2000 | Ray et al. |
| 6,021,397 A | 2/2000 | Jones et al. |
| 6,032,106 A | 2/2000 | Ishii |
| 6,049,772 A | 4/2000 | Payne |
| 6,078,904 A | 6/2000 | Rebane |
| 6,092,050 A | 7/2000 | Lungren |
| 6,098,051 A | 8/2000 | Lupien |
| 6,138,102 A | 10/2000 | Hinckley |
| 6,161,096 A | 12/2000 | Bell |
| 6,173,276 B1 | 1/2001 | Kant et al. |
| 6,219,649 B1 | 4/2001 | Jameson |
| 6,240,399 B1 | 5/2001 | Frank et al. |
| 6,275,814 B1 | 8/2001 | Giansante et al. |
| 6,278,464 B1 | 8/2001 | Kohavi |
| 6,278,981 B1 | 8/2001 | Dembo et al. |
| 6,282,520 B1 | 8/2001 | Schirripa |
| 6,289,296 B1 | 9/2001 | Umeno |
| 6,289,508 B1 | 9/2001 | Erickson |
| 6,330,541 B1 | 12/2001 | Meyer |
| 6,336,102 B1 | 1/2002 | Luskin et al. |
| 6,336,103 B1 | 1/2002 | Baker |
| 6,351,740 B1 | 2/2002 | Rabinowitz |
| 6,360,191 B1 | 3/2002 | Koza et al. |
| 6,373,485 B2 | 4/2002 | Sowizral |
| 6,393,409 B2 | 5/2002 | Young et al. |
| 6,405,179 B1 | 6/2002 | Rebane |
| 6,424,952 B1 | 7/2002 | Yinbal |
| 6,445,391 B1 | 9/2002 | Sowizral |
| 6,470,321 B1 | 10/2002 | Cumming |
| 6,473,084 B1 | 10/2002 | Philips et al. |
| 6,546,375 B1 | 4/2003 | Pang et al. |
| 6,601,044 B1 | 7/2003 | Wallman |
| 6,611,807 B1 | 8/2003 | Bernheim |
| 6,684,190 B1 | 1/2004 | Powers |
| 6,735,571 B2 | 5/2004 | Coleman |
| 6,735,573 B1 | 5/2004 | Gelman |
| 6,895,390 B1 | 5/2005 | Hagan |
| 7,047,167 B2 | 5/2006 | Yamaguchi |
| 2001/0014875 A1 | 8/2001 | Young et al. |
| 2001/0051936 A1 | 12/2001 | Michalewicz |
| 2001/0055019 A1 | 12/2001 | Sowizral |
| 2002/0000986 A1 | 1/2002 | Sowizral |
| 2002/0002521 A1 | 1/2002 | Shearer |
| 2002/0032585 A1 | 3/2002 | Keyes |
| 2002/0033835 A1 | 3/2002 | Sowizral |
| 2002/0038272 A1 | 3/2002 | Menchero |
| 2002/0040307 A1 | 4/2002 | Roscoe |
| 2002/0049618 A1 | 4/2002 | McClure |
| 2002/0050990 A1 | 5/2002 | Sowizral |
| 2002/0059294 A1 | 5/2002 | Bottarelli |
| 2002/0065636 A1 | 5/2002 | Yamaguchi |
| 2002/0082872 A1 | 6/2002 | Aoki |
| 2002/0091605 A1 | 7/2002 | Labe |
| 2002/0091613 A1 | 7/2002 | Kendall |
| 2002/0099929 A1 | 7/2002 | Jin |
| 2002/0111780 A1 | 8/2002 | Sy |
| 2002/0116158 A1 | 8/2002 | Heching |
| 2002/0116309 A1 | 8/2002 | Keyes |
| 2002/0123951 A1* | 9/2002 | Olsen et al. ............... 705/36 |
| 2002/0123953 A1 | 9/2002 | Goldfarb |
| 2002/0128544 A1 | 9/2002 | Diab |
| 2002/0129332 A1 | 9/2002 | Svensson |
| 2002/0138299 A1 | 9/2002 | Nations |
| 2002/0138383 A1 | 9/2002 | Rhee |
| 2002/0143682 A1 | 10/2002 | Bergmann |
| 2002/0147671 A1 | 10/2002 | Sloan et al. |
| 2003/0083971 A1* | 5/2003 | Kawamoto et al. ............ 705/36 |
| 2003/0110113 A1 | 6/2003 | Martin |
| 2003/0139993 A1* | 7/2003 | Feuerverger ................. 705/36 |
| 2003/0144944 A1 | 7/2003 | Kalt et al. |
| 2003/0177077 A1 | 9/2003 | Norman |
| 2003/0182224 A1 | 9/2003 | Horrigan et al. |
| 2003/0187771 A1 | 10/2003 | Bulan |
| 2003/0191672 A1 | 10/2003 | Kendall |
| 2003/0208427 A1 | 11/2003 | Peters et al. |
| 2003/0208432 A1 | 11/2003 | Wallman |
| 2003/0233304 A1 | 12/2003 | Dhurandhar |
| 2004/0059609 A1 | 3/2004 | Chatlain |
| 2004/0078244 A1 | 4/2004 | Katcher |
| 2004/0078248 A1 | 4/2004 | Altschuler |
| 2004/0111278 A1 | 6/2004 | Brown |
| 2004/0181479 A1 | 9/2004 | Zosin et al. |
| 2004/0186804 A1 | 9/2004 | Chakraborty |
| 2004/0186814 A1 | 9/2004 | Chalermkraivuth |
| 2004/0199448 A1 | 10/2004 | Chalermkraivuth |
| 2004/0220837 A1 | 11/2004 | Bonissone |
| 2004/0225536 A1 | 11/2004 | Schoen |
| 2004/0243499 A1 | 12/2004 | Bateson |
| 2005/0055250 A1 | 3/2005 | Wolfgang |
| 2005/0091085 A1 | 4/2005 | Colley |
| 2005/0154617 A1 | 7/2005 | Ruggieri |
| 2005/0187844 A1 | 8/2005 | Chalermikraivuth |
| 2005/0187845 A1 | 8/2005 | Eklund et al. |
| 2005/0187846 A1 | 8/2005 | Subbu et al. |
| 2005/0187847 A1 | 8/2005 | Bonissone et al. |
| 2005/0187848 A1 | 8/2005 | Bonissone et al. |
| 2005/0187849 A1 | 8/2005 | Bollapragada et al. |

FOREIGN PATENT DOCUMENTS

| | | |
|---|---|---|
| EP | 0505087 A2 | 9/1992 |
| JP | 63-279301 | 11/1988 |
| JP | 6-95707 | 4/1994 |
| JP | 7-85110 | 3/1995 |
| JP | 2001-76057 | 3/2001 |
| WO | WO 95/25295 | 9/1995 |
| WO | WO 96/18162 | 6/1996 |
| WO | WO 98/13776 | 4/1998 |
| WO | WO 99/23592 | 5/1999 |
| WO | WO 99/39290 | 8/1999 |
| WO | WO 99/49399 | 9/1999 |
| WO | WO 01/31481 A2 | 5/2001 |
| WO | WO 01/39005 A2 | 5/2001 |
| WO | WO 01/55890 A2 | 8/2001 |
| WO | WO 01/55939 A2 | 8/2001 |
| WO | WO 01/77872 A2 | 10/2001 |
| WO | WO 01/84355 A2 | 11/2001 |
| WO | WO 01/93153 A1 | 12/2001 |
| WO | WO 02/075650 | 9/2002 |

OTHER PUBLICATIONS

Loraschi, A., et al., An Evolutionary Algorithm For Portfolio Selection In A Downside Risk Framework, European Journal of Finance, 1994.

Kalvelagen, E., Solving Multi-Objective Models With GAMS, citeseer.nj.nec.com/article/kalvelagen02solving.html, Sep. 20, 2002.

Rinaldo, F., A Comparison of Stochastic Search Heuristics for Portfolio Optimization, Proceedings of the Second International Conference on Artificial Intelligence Applications on Wall Street, Software Engineering Press, Apr. 1993, pp. 149-151.

Streichert, F., Introduction to Evolutionary Algorithms, University of Tuebingen, Presented at the Frankfurt MathFinance Workshop, Apr. 2, 2002.

Korczak, et al., Evolutionary Approach to Portfolio Optimization, University of Wroclaw, Institute of Computer Science, 2001.

Eklund, N., Multi-objective optimization of spectra using genetic algorithms, Dept. of Decision Sciences and Engineering Systems, RPI, 2001.

Bodie, Z., et al., Investments, Fourth edition, Irwin/McGraw Hill, 1999.

DeFusco, R.A., et al., Quantitative Methods for Investment Analysis, AIMR, 2001.

Hull, J.C., Options, Futures & Other Derivatives, Fourth Edition, Prentice-Hall, 2000.

Back, Thomas, Evolutionary Algorithms in Theory and Practice, Oxford University Press, New York, 1996.

Breiman, L., et al., Classification and Regression Trees, Wadsworth International Group, Calfornia, 1984.

De ath, G., Multivariate Regression Trees: A new technique for modeling species-environment relationships, Ecology, p. 1105, 2001.

Coello, C., et al. Evolutionary Algorithm MOP Approaches, Evolutionary Algorithms for Solving Multi-Objective Problems, pp. 59-99. Kluwer Academic, 2002.

Goldberg, D., Genetic Algorithms in Search, Optimization, and Machine Learning, Addison-Wesley, Massachusetts, 1989.

Dempster, A., Upper and lower probabilities induced by a multivalued mapping, Annals of Mathematical Statistics, 38:325-339, 1976.

Shafer, G., A Mathematical Theory of Evidence, Princeton University Press, Princeton, New Jersey, 1967.

Schweizer B., et al., Associative Functions and Abstract Semi-Groups, Publicationes Mathematicae Debrecen, 10:69-81, 1963.

Bonissone, P., Summarizing and Propagating Uncertain Information with Triangular Norms, International Journal of Approximate Reasoning, 1(1):71-101, Jan. 1987.

Winston, W., Operations Research: Applications and Algorithms, Duxbury Press, Belmont, California, 1994.

Goldberg, D., The Design of Innovation: Lessons from and for Competent Genetic Algorithms Kluwer Academic Publishers, Norwell, Mass., 2002.

Michalewicz, Z., Genetic Algorithms+Data Structures=Evolution Programs (3rd. Ed). Springer-Verlag, Berlin, 1996.

Josephson, J.R., et al. An Architecture for Exploring Large Design Spaces, Proceedings of National Conference of the American Association for Artificial Intelligence, Madison, Wis., pp. 143-150, 1998.

Tarascio, V., Pareto's Methodological Approach to Economics, University of North Carolina Press, Chapel Hill, Va., 1968.

Fong, G., A Multidimensional Framework for Risk Analysis, Financial Analysts Journal, Jul./Aug. 1997.

Larsen, D., et al., Multivariate Regression Tree for analysis of abundance data, 2002.

Albanese, C., et al. Dimension Reduction in the computation of Value-at-risk, Feb. 28, 2002.

Reilly, F.K., et al., Investment Analysis and Portfolio Management, 6th Edition, Dryden, 2000.

Fabozzi, F.J., Fixed income analysis for the chartered financial analyst program, Fabozzi Associates, 2000.

Indraneel, D., et al., A Closer Look at Drawbacks of Minimizing Weighted Sums of Objectives for Pareto Set Generation in Multicriteria Optimization Problems Structural Optimization, 14(1), pp. 63-69, 1997.

Schaffer, J.D., et al., Multi-objective Learning via Genetic Algorithms, Ninth International Joint Conference on Artificial Intelligence, pp. 593-595, 1985.

Subbu, Raj, et al., Modeling and Convergence Analysis of Distributed Coevolutionary Algorithms, IEEE International Congress on Evolutionary Computation, pp. 1276-1283, 2000.

Greene, F., A method for utilizing diploid/dominance in genetic search, First IEEE International Conference on Evolutionary Computation, v1, 439. IEEE Service Center, Piscataway, N.J., pp. 171-176, 1994.

(In book "Foundations of Genetic Algorithms") D. Goldberg and K. Deb, A comparison of selection schemes used in genetic algorithms. In "Foundations of Genetic Algorithms," Rawlins, G. (Ed.), 69. M. Kaufmann Publishers, San Mateo, Calif., 69-93, 1991 (select pages from book, including paper Abstract).

Coello, C., et al., Moses: A multiobjective optimization tool for engineering design, Engineering Optimization, 31:337-368, 1999.

Horn, J., Multicriterion Decision Making, Handbook of Evolutionary Computation, (Back T, Fogel DB and Michalewicz Z, eds.), pp. F1.9:1-F1.9:15, IOP Publication Ltd and Oxford University Press, 1997.

Subbu, Raj, et al., Modeling and Convergence Analysis of Distributed Coevolutionary Algorithms, IEEE Transactions on Systems, Man, and Cybernetics—Part B: Cybernetics, vol. 34, No. 2, Apr. 2004.

U.S. Appl. No. 10/390,689, filed Mar. 19, 2003 and the art cited therein.

U.S. Appl. No. 10/390,709, filed Mar. 19, 2003 and the art cited therein.

JPMorgan/Reuters RiskMetrics™ —Technical Documents Fourth Edition, Dec. 17, 1996.

Jorge Mina & Andrew Ulmer Delta-Gamma Four Ways Aug. 31, 1999.

Stefan Pichler & Karl Selitsch A Comparison of Analytical VaR Methodologies for Portfolios That Include Options Dec. 1999.

Jorge Mina & Jerry Yi Xiao return to RiskMetrics: The Evolution of a Standard Apr. 2001.

Eklund, Neil Holger White, Multiobjective visible spectrum optimization: A genetic algorithm approach, Rensselaer Polytechnic Institute, vol. 6311B of Dissertations Abstracts International, 2002.

Abbass, H.A., Sarker, R Newton, C, PDE:a Pareto-frontier differential evolution approach for multi-objective optimization problems, Proceedings of the 2001 Congress on Evolutionary Computation, vol. 2, IEEE, May 27-30, 2001.

Ignizio, James, An Algorithm for Solving the Linear Goal Programming Problem by Solving Its Dual, The Journal of the Operational research Society, vol. 36, No. 6 (Jun. 1985) pp. 507- 515.

Masud, Abu, Interactive Sequential Goal Programming, The Journal of the Operational Research Society, vol. 32, No. 5 (May 1981), pp. 391-400.

Bellmore, M, Generalized Penalty function Concepts in Mathematical Optimization, Operations research, vol. 18, No. 2 (Mar.-Apr. 1970), pp. 229-252.

Iwamura, K., Chances constrained integer Programming Models for Capital Budgeting in Fizzy Environments, The Journal of the Operational Research Society, vol. 49, No. 8 (Aug. 1998), pp. 854-860.

Iyer, Naresh Sundaram, "A family of dominance filters for multiple criteria decision making: Choosing the right filter for a decision situation". Proquest Dissertations and Theses 2001. Section 0168, Part 0984 169 pages: [Ph.D. dissertation]. United States—Ohio: The Ohio State University: 2001. Publication No. AAT 3035522.

Benson, "An All-Linear Programming Relaxation Algorithm for Optimizing Over the Efficient Set", Journal of Global Optimization, vol. 1, pp. 83-104, 1991.

Yang et al., "Normal Vector Identification and Interactive Tradeoff Analysis Using Minimax Formulation in Multiobjective Optimization", IEEE Transactions on Systems, Man, and Cybernetics—Part A: Systems and Humans, vol. 32, No. 3, pp. 305-319, May 2002.

Fong, "Multidimensional Risk", DerivativesStrategy.com, 4 pages, Oct. 1995-1996.

* cited by examiner

Iteration of the SLP process: Calculate the tangent plane to the nonlinear risk function and add a new constraints by adjusting the tangent plane by the step size ε. Solve the resulting problem to obtain a new solution (2).

METHODS AND SYSTEMS FOR ANALYTICAL-BASED MULTIFACTOR MULTIOBJECTIVE PORTFOLIO RISK OPTIMIZATION

BACKGROUND OF THE INVENTION

The systems and methods of the invention relate to portfolio risk optimization.

Various techniques are known for portfolio optimization. Typically, the portfolio optimization problem is defined by maximizing a return measure while minimizing a risk measure given a set of constraints. For example, classical Markowitz portfolio theory has been widely used as a foundation for portfolio optimization. However, the framework has two major drawbacks that reduce its application to practical investment problems. First, due to the nonlinearity of the risk measure (variance), the optimization problem has to be solved by a nonlinear programming (NLP) optimizer. In a problem with high dimension, general purpose nonlinear optimizers cannot generate an optimal solution within a reasonable amount of time. Typically, problems with 30-50 asset classes reach the practical limit of a NLP optimizer. Portfolio managers may use mean-variance optimization to determine broad asset allocations, but these solutions then must be further evaluated to determine an investment strategy that can be implemented, and this process generally leads to suboptimal solutions. With very large portfolio values, even small degradations in solution quality can have a significant impact on the calculated return.

The second drawback deals with the risk measure. Variance measures the variation around mean. It is an accepted risk measure in a normal situation. Risk managers may also want to manage the portfolio to weather the occurrences of rare events with severe impact. Therefore, the downside risk, also called tail risk, has to be minimized. The variance measure does not provide sufficient information about the tail risk when the distribution is not symmetrical about its mean (e.g., in a non-normal distribution situation). Asymmetric return distributions are common in practice. Therefore, a third measure, in addition to return and variance, is required to account for tail risk.

For institutions with asset-liability management (ALM) constraints, e.g., insurance companies and banks, portfolio managers need to match the asset characteristics with those of liabilities. One of the most well studied risk factors is interest rates risk. In an immunization process, asset duration is approximately matched with liability duration to be within a pre-specified target duration mismatch range. Convexity is included in the analysis to improve accuracy. To further improve the analysis, key rate durations are used to capture the non-parallel movement of the yield curve.

In a traditional ALM optimization, the problem is formulated as:

Maximize Return Measure:

subject to (s.t.):
  Partial duration mismatches≦target;
  Total duration mismatch≦target;
  Total Convexity mismatch≦target; and
  Other linear constraints.

This optimization problem is currently solved using a Linear Programming (LP) optimizer as the objective function and the constraints are linear. However, this approach yields a sub-optimal solution because the problem formulation does not include a measure of the overall portfolio risk. Portfolio managers need to adjust a number of linear risk constraints to achieve the desired targets. Including the risk measure makes the problem nonlinear and unsolvable using an LP optimizer. In other words, the formulation does not provide portfolio managers full control over the portfolio total risk. They may use total duration as a proxy for the total risk and control the total duration mismatch while loosening the constraints on the key rate duration mismatches. Due to the theoretical drawbacks of the total duration measure, one can challenge the technical soundness of this approach.

The problem becomes worse when multiple risk factors are included in the portfolio analysis. The interactions between the risk factors require more integrated risk measures that provide the portfolio managers a better view of the portfolio total risk. Experienced portfolio managers can manually adjust the constraints on risk sensitivities, i.e. key rate duration and convexity, to obtain a better risk/return portfolio by evaluating the risk measure after the optimization is completed. This iterative process may take approximately two weeks or more and yields suboptimal solutions.

Due to complexities of the risk and its impact on the portfolios, improvements are needed on the risk measures in addition to the conventional variance measure. Risk measures should provide additional information about the distribution of the portfolio values. The portfolio managers want to manage the risk caused by rare events, i.e., downside risk. A simulation technique is generally used to generate the distribution of the portfolio value based on a set of possible scenarios. The technique requires a significant amount of computation. Therefore, the simulation approach is mostly used to serve risk measurement rather than risk optimization purposes. Scenario-based optimization approach, which is based on the simulation technique, requires at least as much computational time as the simulation technique. Moreover, it is limited to only linear risk functions.

The invention addresses the above problems, as well as other problems, that are present in conventional techniques.

BRIEF DESCRIPTION OF THE INVENTION

In accordance with one embodiment, the invention provides a method for determining the allocation of securities in a portfolio, the method comprising: providing a collection of securities in a portfolio, each security being associated with associated attributes; providing risk factor data related to the portfolio; pooling the securities into a plurality of security clusters based on the attributes associated with each security and the risk factor data, each security being assigned to an security cluster, the pooling being performed using multivariate decision tree processing; processing the security clusters using a nonlinear programming optimizer to generate optimization results; and presenting the optimization results in a risk-return space for determination of a security allocation.

In accordance with a further embodiment, the invention provides a system for determining the allocation of securities in a portfolio, the system comprising: a security attribute portion, being at least one of an asset data portion and a liability data portion, containing security attributes that provides a collection of securities in a portfolio, each security being associated with associated attributes; a risk factor data portion that provides risk factor data related to the portfolio; a pooling portion that pools the securities into a plurality of security clusters based on the attributes associated with each security and the risk factor data, each security being assigned to an security cluster, the pooling being performed using multivariate decision tree processing; an optimization portion that processes the security clusters using a nonlinear programming optimizer to generate optimization results; a presentation portion that presents the optimization results in a risk-return space for determination of a security allocation.

In accordance with a further embodiment, the invention provides a computer readable medium for determining the allocation of securities in a portfolio, the computer readable medium comprising: a first portion that provides a collection of securities in a portfolio, each security being associated with associated attributes; a second portion that provides risk factor data related to the portfolio; a third portion that pools the securities into a plurality of security clusters based on the attributes associated with each security and the risk factor data, each security being assigned to a security cluster, the pooling being performed using multivariate decision tree processing; a fifth portion that processes the security clusters using a nonlinear programming optimizer to generate optimization results; and a sixth portion that presents the optimization results in a risk-return space for determination of a security allocation.

BRIEF DESCRIPTION OF THE DRAWINGS

The present invention can be more fully understood by reading the following detailed description together with the accompanying drawings, in which like reference indicators are used to designate like elements, and in which.

DETAILED DESCRIPTION OF THE INVENTION

Hereinafter, aspects of the methods and systems for portfolio optimization in accordance with various embodiments of the invention will be described. As used herein, any term in the singular may be interpreted to be in the plural, and alternatively, any term in the plural may be interpreted to be in the singular.

Analytical methods and systems are disclosed for solving multifactor multi-objective portfolio risk optimization problems for securities. As used herein a "security" or "securities" means a financial instrument, which might illustratively be either investment security (e.g. bonds and/or stocks) or insurance products (e.g. a life insurance policy and/or guarantee investment contracts), for example, as well as a wide variety of other financial instruments. The proposed analytical-based optimization approach achieves higher computational efficiency by utilizing analytical forms of risk measures in conjunction with mathematical transformations to simplify formulas for computation without losing accuracy, in accordance with one embodiment of the invention. The risk measures may be developed from a multifactor risk framework. The optimization results are presented in a multidimensional risk-return space. The portfolio risk optimization problem may be reformulated with additional risk measures and may be solved either by using (1) multivariate decision trees in conjunction with a nonlinear programming (NLP) optimizer; or (2) sequential linear programming (SLP) process. Accordingly, a technical contribution for the disclosed inventive technology is to provide systems and methods for solving multifactor multi-objective portfolio risk optimization problems, as set forth in the Brief Description of the Invention, above.

Figure 1:
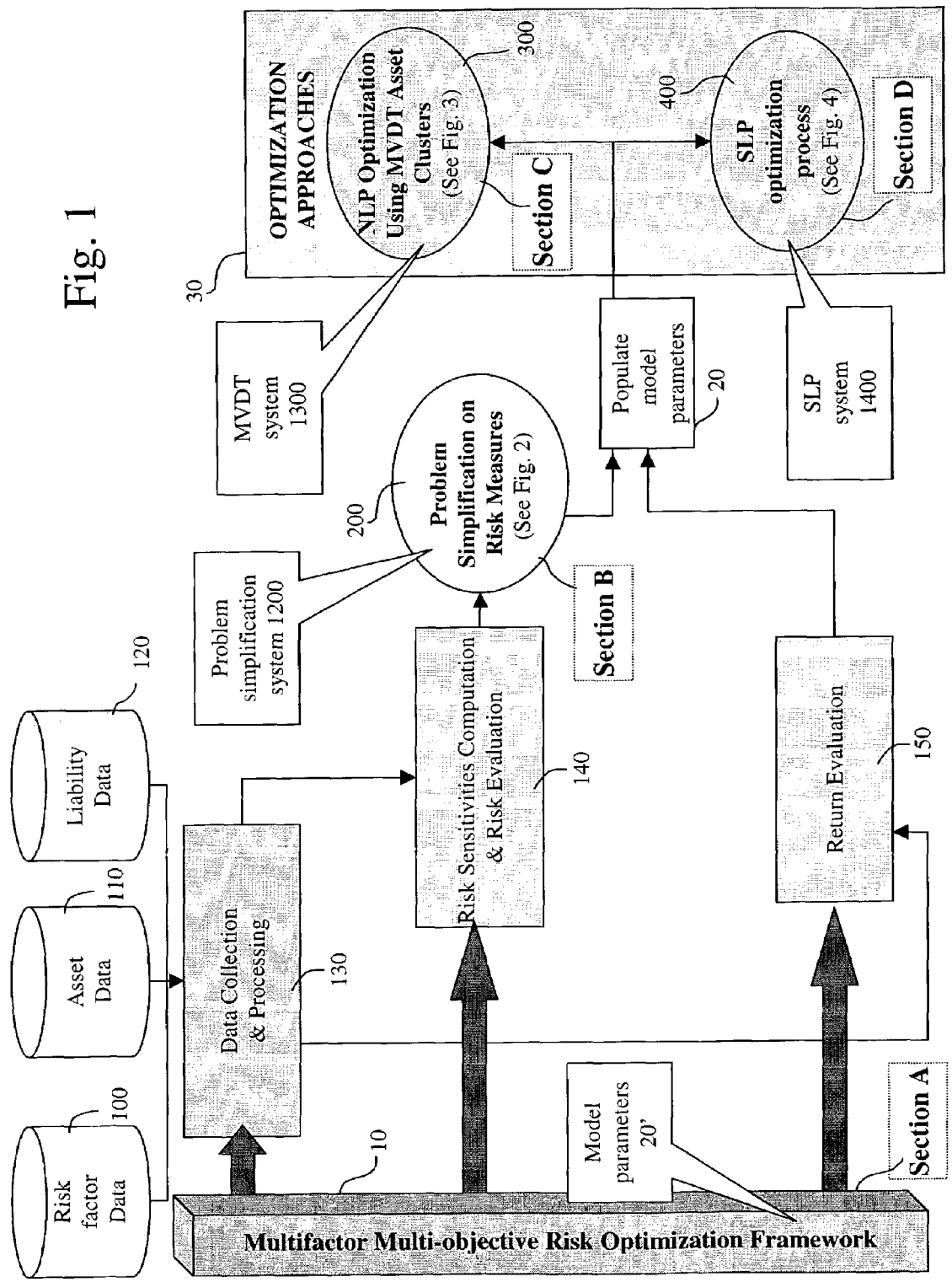
FIG. 1 is a high level flowchart showing an optimization process in accordance with one embodiment of the invention.

In accordance with one embodiment of the invention, FIG. 1 is a high-level flowchart showing aspects of an optimization process. In particular, FIG. 1 shows that two different optimization processes (300, 400) may be used for solving a reformulated optimization problem. One optimization approach uses multivariate decision tree asset clustering. The other optimization approach uses sequential linear programming (SLP) approach. Further, FIG. 1 shows that a problem simplification process 200 may be performed in accordance with additional aspects of the invention.

The process of FIG. 1 starts with the analysis of risk factors. This can be done through risk factor data. The data can be either historical data or risk factor scenarios provided by a scenario generation subprocess. In a valuation subprocess, risk sensitivities and return measures of both assets and liabilities are evaluated. The problem simplification method may be added to improve the computational efficiency.

To explain further, in accordance with one embodiment of the invention, the process of FIG. 1 starts with the data collection and processing of various types of data, as shown in step 130. The input data might include risk factor data 100, asset data 110 and/or liability data 120. It is appreciated that the initial data collection and processing that is performed corresponds to the particular multifactor multi-objective portfolio risk optimization framework 10 that is applied in a particular situation. The particular multifactor multi-objective portfolio risk optimization framework 10 that is chosen depends on the nature of the evaluation being performed, the nature of the various inputs (100, 110 and 120) and the particular outputs that are desired, for example. The multifactor multi-objective portfolio risk optimization framework 10 that is chosen possesses a variety of model parameters 20'.

As shown in FIG. 1, the process includes the computation of risk sensitivities and risk evaluation in step 140. Further, the process involves the evaluation of returns in step 150. The processing of both step 140 and step 150, in accordance with one embodiment of the invention, provides the processed data to populate the model parameters 20' of the multifactor risk optimization framework 10. Accordingly, the model parameters 20' are populated in step 20.

As shown in FIG. 1, in accordance with one embodiment of the inventive technology, the process of FIG. 1 may include step 200. Step 200 provides for the problem simplification of risk measures, i.e., further to the computation of risk sensitivities and the evaluation of risk in step 140. Further details of step 200 are described below. It is appreciated that the processing of step 200 may be used in the situation where the risk measure is particularly complex, for example.

After the optional problem simplification of step 200 and the evaluation of return of step 150, in step 20 the process of FIG. 1 populates the model parameters of the multifactor risk optimization framework 10, as noted above. After step 20, the inventive technology includes two different optimization approaches in the optimization step 30. One optimization approach includes the use of nonlinear programming optimization using multivariate decision tree processing in step 300, i.e., so as to result in security clustering. This optimization approach is described in Section C below. Another different optimization approach includes the use of sequential linear programming (SLP) of step 400. The SLP optimization process is described in Section D below. It is noted that either of the multivariate decision tree processing of step 300 or the SLP processing of step 400 may or may not be used in conjunction with the problem simplification on risk measures processing of step 200.

A. The Multifactor Multiobject Portfolio Risk Optimization Framework

Hereinafter, aspects of the multifactor multi-objective portfolio risk optimization framework used in the invention will be described. In accordance with one embodiment of the invention, as a first step, we developed the risk measures for optimization by combining the known frameworks proposed by Fong and Vasicek (1997) and Hull (2000). (Fong, G., and Oldrich A. Vasicek, "A Multidimensional Framework for Risk Analysis", Financial Analysts Journal, July/August 1997; and Hull, J. C., "Options, Futures & Other Derivatives", 4$^{th}$ Edition, Prentice Hall, 2000).

That is, for an individual security, for example, (which can be either an asset or a liability security), the value of the security is assumed a function of multiple risk factors:

$$V_k = f(F_1, F_2, \ldots, F_m)$$

The risk factors are the representations, i.e., proxies, of the underlying risk exposures that affect the variation of the security value. Examples of risk exposures are interest rate, foreign exchange, prepayment, credit, and liability risk, for example. More than one factor can be used to represent an individual risk exposure. For example, key rates on the yield curve are used to capture the term structure risk exposure.

The change in the value of the security may be approximated by the Taylor series expansion to second order given by:

$$\Delta V_k \approx \sum_{i=1}^{m} \left( \frac{\partial V_k}{\partial F_i} \right) \Delta F_i + \frac{1}{2} \sum_{i=1}^{m} \sum_{j=1}^{m} \left( \frac{\partial^2 V_k}{\partial F_i \partial F_j} \right) \Delta F_i \Delta F_j \quad (1)$$

where, $\Delta V_k$=the change in value of the security k $\Delta F_i$=the change in value of the $i^{th}$ risk factor, where i ranges from 1 to m $\Delta F_j$=the change in value of the $j^{th}$ risk factor, where j ranges from 1 to m $\partial V_k/\partial F_i$=the first partial derivative of the value function with respect to $i^{th}$ risk factor, where i ranges from 1 to m $\partial^2 V_k/\partial F_i \partial F_j$=the second partial derivative of the value function with respect to $i^{th}$ and $j^{th}$ risk factors, where i and j range from 1 to m Further, risk sensitivities may be defined as the first and second-partial derivative of the security value with respect to the risk factors. Equivalent measures for fixed-income securities are duration and convexity. There are variations of risk sensitivity measures. First, we can define as the percentage change of the security value with respect to change in the risk factor. Delta (or partial duration) and gamma (or partial convexity) can be written as:

$$\delta_{k,i} = \frac{1}{V_k} \frac{\partial V_k}{\partial F_i} \quad (2)$$

$$\gamma_{k,ij} = \frac{1}{V_k} \frac{\partial^2 V_k}{\partial F_i \partial F_j}$$

The second definition is the absolute change in the security value against change in the risk factor. Monetary delta and monetary gamma may be defined as the following:

$$\bar{\delta}_{k,i} = \delta_{k,i} V_k = \frac{\partial V_k}{\partial F_i} \quad (3)$$

$$\bar{\gamma}_{k,ij} = \gamma_{k,ij} V_k = \frac{\partial^2 V_k}{\partial F_i \partial F_j}$$

Further, Equation (1) may be re-written as, $$\Delta V_k = \sum_{i=1}^{m} \bar{\delta}_{k,i} \Delta F_i + \frac{1}{2} \sum_{i=1}^{m} \sum_{j=1}^{m} \bar{\gamma}_{k,ij} \Delta F_i \Delta F_j \quad (4)$$

For a portfolio comprised of n securities, the portfolio value and the change in the portfolio value is a summation of the security value and the change in the individual security value respectively.

$$V_P = \sum_{k=1}^{n} V_k$$

and $$\Delta V_P = \sum_{k=1}^{n} \Delta V_k$$

The change in the portfolio value may then be written as:

$$\Delta V_P = V_P \left[ \sum_{k=1}^{n} \sum_{i=1}^{m} w_k \delta_{k,i} \Delta F_i + \frac{1}{2} \sum_{k=1}^{n} \left( \sum_{i=1}^{m} \sum_{j=1}^{m} w_k \gamma_{k,ij} \Delta F_i \Delta F_j \right) \right] \quad (5)$$

where, $$w_k = \frac{V_k}{V_P}$$

$w_k$=the weight assigned to the security k

Further, the portfolio risk sensitivities (delta and gamma) may be defined as, $$\bar{\delta}_{P,i} = V_P \sum_{k=1}^{n} w_k \delta_{k,i}$$

$$\bar{\gamma}_{P,ij} = V_P \sum_{k=1}^{n} w_k \gamma_{k,ij}$$

Rewrite the change in portfolio value:

$$\Delta V_P = \sum_{i=1}^{m} \bar{\delta}_{P,i} \Delta F_i + \frac{1}{2} \sum_{i=1}^{m} \sum_{j=1}^{m} \bar{\gamma}_{P,ij} \Delta F_i \Delta F_j \quad (6)$$

or $$\Delta V_P = V_P \left[ \sum_{i=1}^{m} \delta_{P,i} \Delta F_i + \frac{1}{2} \sum_{i=1}^{m} \sum_{j=1}^{m} \gamma_{P,ij} \Delta F_i \Delta F_j \right]$$

Next, we derive the analytical forms of the risk measures that describe the distribution of the change in the portfolio value. From now on, we deal with the change in the portfolio value. The subscription P is dropped to simplify the equations.

We start with the definitions of the first three moments.

$$E[\Delta V] = \sum_{i=1}^{m} \bar{\delta}_i E[\Delta F_i] + \frac{1}{2} \sum_{i=1}^{m} \sum_{j=1}^{m} \bar{\gamma}_{ij} E[\Delta F_i \Delta F_j] \quad (7)$$

$$E[(\Delta V)^2] = \sum_{i,j}^{m} \bar{\delta}_i \bar{\delta}_j E[\Delta F_i \Delta F_j] + \quad (8)$$

$$\frac{1}{4} \sum_{i,j,k,l}^{m} \bar{\gamma}_{ij} \bar{\gamma}_{kl} E[\Delta F_i \Delta F_j \Delta F_k \Delta F_l] +$$

$$\sum_{a,b,c}^{m} \bar{\delta}_a \bar{\gamma}_{bc} E[\Delta F_a \Delta F_b \Delta F_c]$$

$$E[(\Delta V)^3] = \sum_{i,j,k}^{m} \bar{\delta}_i \bar{\delta}_j \bar{\delta}_k E[\Delta F_i \Delta F_j \Delta F_k] + \quad (9)$$

$$\frac{1}{8} \sum_{a,b,c,d,e,f}^{m} \bar{\gamma}_{ab} \bar{\gamma}_{cd} \bar{\gamma}_{ef} E[\Delta F_a \Delta F_b \Delta F_c \Delta F_d \Delta F_e \Delta F_f] +$$

$$\frac{3}{2} \sum_{i,j,k,l}^{m} \bar{\delta}_i \bar{\delta}_j \bar{\gamma}_{kl} E[\Delta F_i \Delta F_j \Delta F_k \Delta F_l] +$$

$$\frac{3}{4} \sum_{a,b,c,d,e}^{m} \bar{\gamma}_{ab} \bar{\gamma}_{cd} \bar{\delta}_e E[\Delta F_a \Delta F_b \Delta F_c \Delta F_d \Delta F_e]$$

where, E[.] is the expectation operator.

These three moments are building blocks for the developing of the analytical forms of the risk measures. We can further improve the risk measures, which will be developed below, by adding the higher moments of the value change function, for example the fourth moment function, $E[(\Delta V)^4]$.

It is appreciated that the higher order interactions among risk factors are computationally intensive if the number of risk factors is large. A problem simplification method can be exploited with linear algebra manipulation.

Now, we are ready to define portfolio risk measures. In accordance with one embodiment of the invention, the first measure is the variance (or standard deviation). The analytical form of the variance is given by:

$$\sigma^2 = E[(\Delta V)^2] - E[(\Delta V)]^2 \quad (10)$$

In the case that the distribution of the change in the portfolio value is not symmetric, another appropriate measure of risk will be skewness. The analytical form of the skewness is given by:

$$\xi = \frac{1}{\sigma^3} E[(\Delta V - E[\Delta V])^3] \quad (11)$$

$$= \frac{E[(\Delta V)^3] - 3E[(\Delta V)^2]E[\Delta V] + 2E[\Delta V]^3}{\sigma^3}$$

In risk management, value at risk (VAR) is generally applied to measure and manage the downside risk, i.e., the tail risk. It captures the impact on the portfolio value from rare events. Hull (2000) (Hull, J. C., "Options, Futures & Other Derivatives", 4$^{th}$ Edition, Prentice Hall, 2000) uses the Cornish-Fisher expansion to estimate the VAR of a non-normal distribution. The analytical form is written as:

$$VAR(q) = \mu + w_q \sigma \quad (12)$$

where $\mu$=the mean of the distribution $\sigma$=the standard deviation of the distribution $\xi$=the skewness of the distribution $$w_q = z_q + \frac{1}{6}(z_q^2 - 1)\xi$$

$z_q$=the q-percentile of the standard normal distribution

We can further improve the analytical form of the VAR by incorporating the fourth moment function of risk factors.

We have shown the analytical forms of three risk measures, i.e. variance, skewness, and VAR. The approach can be applied to any analytical risk measures that can be derived from the fundamental building blocks defined in Equations (7), (8), and (9).

Portfolio optimization problems can often be expressed as:

Problem P

Maximize g(w); and

Minimize f(w);

Subject to:

h(w)≦b; and l(w)=C.

where w is a vector representing the fractions of the portfolio that are invested in each asset, g is a linear function, usually return measure, f is a vector of non-linear functions, typically risk measures, h is a set of linear inequality constraints, and l is a set of linear equality constraints, and the ultimate objective is to define the efficient frontier between the competing objectives g and f.

With the risk measures defined above, we reformulate the optimization problem as:

Problem P1

Maximize return measure or g(w);

Subject to:
  Risk measure$_p$ or $f_p(w) \leq$ target$_p$ for p=1, 2, ..., P; and
  Other linear constraints or Problem P2

Minimize
  A risk measure q or $f_q(w)$;

Subject to:
  Return measure or g(w)$\geq$target;
  Risk measure$_p$ or $f_p(w) \leq$ target$_p$ for p=1, 2, ..., n and p$\neq$q; and, other linear constraints.

Figure 8:
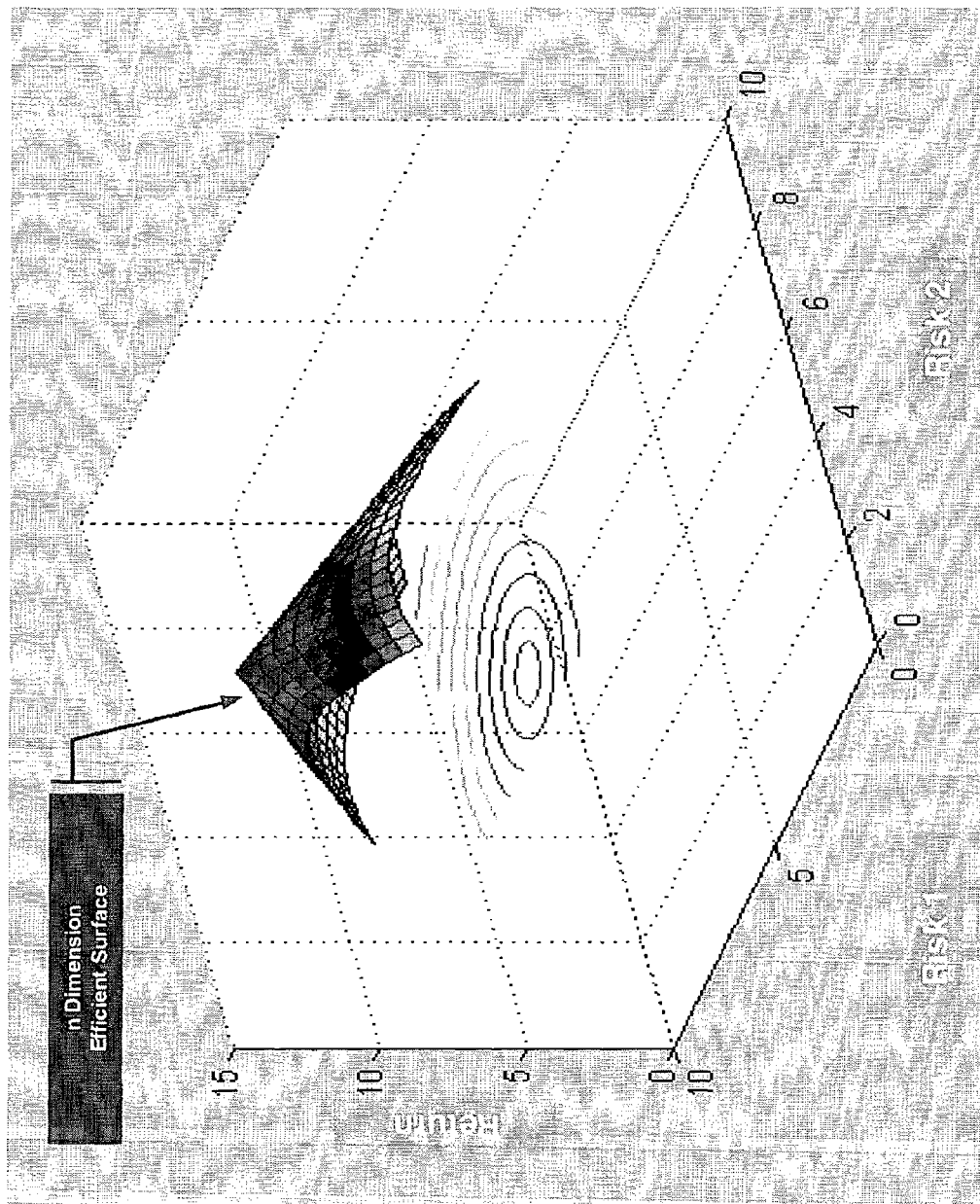
FIG. 8 is a diagram illustrating further aspects of an efficient frontier in three-dimensional space in accordance with one embodiment of the invention.

In practice, we can include some of the duration/convexity mismatch constraints to control any particular risk factors of interest. By solving the optimization iteratively with adjusting risk or return targets, the efficient frontier can be identified. In the classical Markowitz portfolio theory, there is only one risk measure that is the portfolio variance (or standard deviation). If the portfolio managers want to manage other aspects of portfolio risk, more than one risk measure can be entered into the optimization problem. For example, if VAR is included as a measure of downside risk, the efficient frontier is a surface in a three-dimensional space, as shown in FIG. 8. Further risk measures may be added by adding yet further dimensions. Thus, the efficient frontier might be two-dimensional, three dimensional, or more than three-dimensional, i.e., hypersurface.

The optimization problem that is formulated above cannot be solved by an LP optimizer any longer since the risk measures are nonlinear. An NLP optimizer cannot be applied directly into practice due to computational limit. In ALM portfolio optimization, the portfolio managers want to have more granular asset selection strategies, rather than broad asset allocation. The NLP optimizer reaches the practical runtime limit at about 30-50 asset classes, and even then, iteration to determine the efficient frontier is prohibitive. To overcome this hurdle the inventive technology, as described herein, provides two different independent methods: (1) multivariate decision trees in conjunction with a nonlinear programming (NLP) optimizer to solve problem (P2), or (2) sequential linear programming (SLP) algorithm to solve problem (P1). Further, either of these methods may be used with an inventive risk measure "problem simplification" process.

B. Risk Measure Simplification for Computational Efficiency

Figure 2:
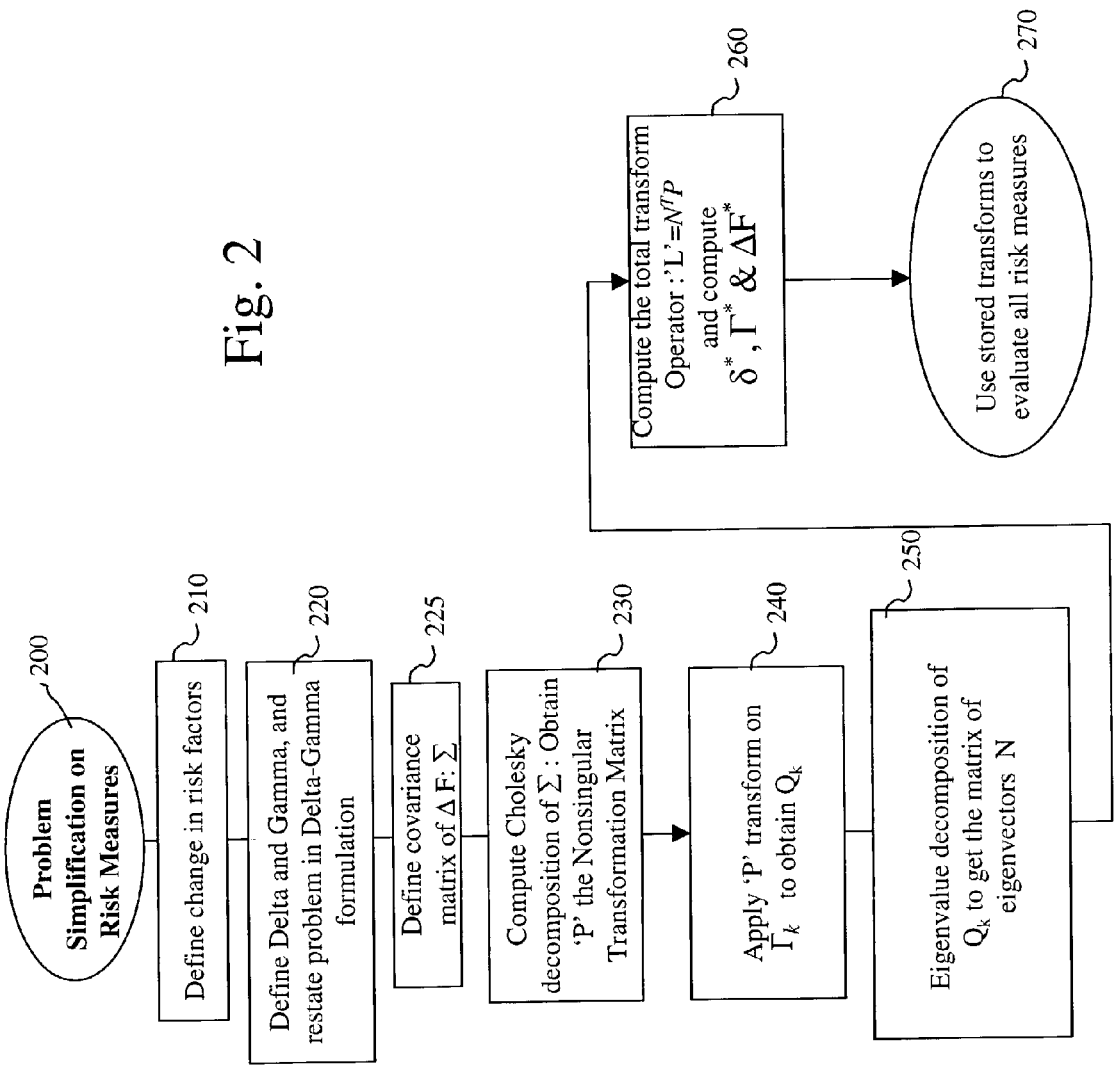
FIG. 2 is a flowchart showing the "problem simplification on risk measures" step of FIG. 1 in accordance with one embodiment of the invention.

Hereinafter, aspects of step 200 of FIG. 1 will be described in further detail. FIG. 2 is a flowchart showing further details of the risk measure simplification process. The process of FIG. 2 uses the risk factor data 100, the asset data 110, and the liability data 120, as described above. As shown in FIG. 2, the process starts in step 200 and passes to step 210. As described above, the framework for an individual security 'k' (can be either asset or liability), the value of the security is assumed a function of multiple risk factors:

$$V_k = f(F_1, F_2, \ldots, F_m)$$

In terms of the optimization problem, the main quantity of interest is the change in the portfolio value, which was described in Equation (5) as:

$$\Delta V_P = V_P \left[ \sum_{k=1}^{n} \sum_{i=1}^{m} w_k \delta_{k,i} \Delta F_i + \frac{1}{2} \sum_{k=1}^{n} \left( \sum_{i=1}^{m} \sum_{j=1}^{m} w_k \gamma_{k,ij} \Delta F_i \Delta F_j \right) \right]$$

where $$w_k = \frac{V_k}{V_P}$$

The weights $w_k$ are the unknown decision variables. Thus, one can see that from the optimization perspective the computational intensity of the problem depends both on 'm', the numbers of risk factors, as well as 'n', the numbers of individual securities.

Since the analytical form of the problem formulation has a quadratic form in terms of the risk factors, the effective computational order of the term involves $O(nm^2)$. To give an idea of the computational intensity in our case, that's 2000×10×10=200,000 evaluations.

As explained earlier, value at risk (VAR), for example, is generally applied to measure and manage the downside risk, i.e., the tail risk. It captures the impact on the portfolio value from rare events. The popular Cornish-Fisher expansion to estimate the VAR of a non-normal distribution is given in equation (12). Note that it depends on the skewness measure which is given by:

$$\xi = \frac{1}{\sigma^3} E[(\Delta V - E[\Delta V])^3]$$
$$= \frac{E[(\Delta V)^3] - 3E[(\Delta V)^2]E[\Delta V] + 2E[\Delta V]^3}{\sigma^3}$$

As should be appreciated, the various measures of risk are actually functions of higher order moments of the main analytical form and the various measures of risk can involve computations of order $O(m^6)$ and beyond. Thus, a simplification procedure to reduce the complexity and subsequently increase computational efficiency can have substantial benefits in processing time. In this section, we propose a simplification through matrix manipulation of the expressions presented above to handle the computational intensity.

The objective here is to apply a set of nonsingular linear transformations, first on the covariance structure of the various risk factors (i.e., essentially, doing a Principal Component transformation) and then apply this transform on the matrix of gamma (i.e. convexity) and then perform an Eigenvalue decomposition that provides us with a diagonalized form. Thus, we can operate on a transformed space where the transformed risk factors become orthogonal to each other and yet have an equivalent analytical form as in the beginning. By performing these sets of transformations we ensure that in evaluating the high order moments, all cross-terms (i.e. off-diagonal elements) disappear due to orthogonality, and we always have O(m) expressions to evaluate. The various manipulations in accordance with this aspect of the inventive technology are described below.

With reference to FIG. 2, the process defines the change in risk factors in step 210. That is, let us consider the 'm' risk factors and define the change in each by:

$$F_{m\times 1} = \begin{pmatrix} F_1 \\ F_2 \\ \ldots \\ F_m \end{pmatrix} \Rightarrow \Delta F_{m\times 1} = \begin{pmatrix} \Delta F_1 \\ \Delta F_2 \\ \ldots \\ \Delta F_m \end{pmatrix} \quad (13)$$

Further, in step 220, the process defines Delta and Gamma and restates the problem in Delta-Gamma formulation as defined in Equations (2) and (3). In this section, we will use δ and Γ to represent monetary delta and monetary gamma as defined in Equations (3). That is, define Delta and Gamma as:

$$\delta_k = \begin{pmatrix} \frac{\partial V_k}{\partial F_1} \\ \ldots \\ \frac{\partial V_k}{\partial F_m} \end{pmatrix} \quad (14)$$

$$\Gamma_k = \begin{pmatrix} \frac{\partial^2 V_k}{\partial F_1^2} & \ldots & & \\ & & & \frac{\partial^2 V_k}{\partial F_j \partial F_i} \\ & \frac{\partial^2 V_k}{\partial F_i \partial F_j} & & \\ & & & \frac{\partial^2 V_k}{\partial F_m^2} \end{pmatrix} \quad (15)$$

Where the index k denotes the $k^{th}$ security. Thus, we restate the above problem in the Delta-Gamma formulation as:

$$\Delta V_k = \delta_k^T \Delta F + \tfrac{1}{2} \Delta F^T \Gamma_k \Delta F \quad (16)$$

where, superscript T is a matrix transpose operator.

After step 220 of FIG. 2, the process passes to step 225, as shown in FIG. 2. In step 225, the process defines the covariance matrix of ΔF. The covariance matrix of ΔF is defined by:

$$\Sigma = \begin{pmatrix} \sigma_1^2 & \ldots & \\ & & \sigma_{ij} \\ & \sigma_{ij} & \\ & & \sigma_m^2 \end{pmatrix} \quad (17)$$

Then, the process passes to step 230. Given the above, in step 230, we take the Cholesky decomposition of Σ:

$$P\Sigma P^T = I \quad (18)$$

where P is nonsingular and I is the Identity matrix whose diagonal entries are '1' and all off-diagonal entries are '0'. Note this is possible since Σ is positive definite and symmetric. The Cholesky decomposition is a step through which we decompose Σ to obtain a set of linear non-singular transformation "P"—which when applied on ΔF produces a transformed space in which the "new" ΔFs are linearly independent (Since Variance(PΔF)=P*Variance(ΔF)*$P^T$=PΣ$P^T$=I Hence, all off-diagonals are '0' so linear independence i.e. covariance of $i^{th}$ and $j^{th}$ terms=0) A property which we utilize in the proof which follows in the next section.

Then, in step 240, the "P" transform is applied on $\Gamma_k$ to obtain $Q_k$.

Let $$Q_k = (P^{-1})^T \Gamma_k (P^{-1}) \quad (19)$$

The rationale of working with $Q_k$ is simple. It's the arising coefficient matrix (If $\Delta F^T \Gamma_k \Delta F$ is a Quadratic form then $\Gamma_k$ is its corresponding coefficient matrix) of the transformed Quadratic form post application of the transform "P" on ΔF $$\Delta F^T \Gamma_k \Delta F = \Delta F^T (P)^T (P^{-1})^T \Gamma_k (P^{-1})(P) \Delta F$$
$$= (P\Delta F)^T Q_k (P\Delta F)$$

Note that as explained earlier we want an equivalent expression to equation (16) so that the new form would be simpler to handle computationally. Thus by working with P we have achieved linear independence amongst the factors but the new matrix $Q_k$ is still not diagonal. This we achieve with the next step.

After step 240, the process passes to step 250. In step 250, the process determines the Eigenvalue decomposition of $Q_k$ to get the matrix of eigenvectors N. That is, consider the Eigenvalue decomposition of Q:

$$N^T Q_k N = \Gamma^*_k \quad (20)$$

$$N^T N = I = NN^T$$

where Γ*, where is Γ* a new defined matrix of Γ, is now diagonal and N is the orthogonal Eigenvector matrix by orthogonality.

From the above we get $$N^T (P^{-1})^T \Gamma_k (P^{-1}) N = \Gamma^*_k$$

or $$(P^T N) \Gamma^*_k (N^T P) = \Gamma_k$$

Let $(N^T P) = L$

Thus, $L^T \Gamma^*_k L = \Gamma_k$

With $L = N^T P$ define $$\Delta F^* = L \Delta F$$

This is the final transformed set of ΔF which combines the 2 step transformation process and diagonalizes $\Gamma_k$ by applying the orthogonal transformation "N". That we indeed have achieved all the goals, is illustrated by the proof in the following section.

Properties of $\Delta F^*$, under the assumption of $E(\Delta F)=0$:

$E(\Delta F^*)=E(L\Delta F)=LE(\Delta F)=0$ [Since, $E(\Delta F)=0$]

$$\begin{aligned}\text{Variance}(\Delta F^*) &= \text{Variance}(L\Delta F) \\ &= L\Sigma L^T \\ &= (N^T P)\Sigma(N^T P)^T \\ &= N^T(P\Sigma P^T)N \\ &= N^T N \text{ Since, } P\Sigma P^T = I \\ &= I\end{aligned}$$

With these our problem can now be easily rewritten as:

$$\Delta V_k = \delta^{*T}_k \Delta F^* + \tfrac{1}{2}\Delta F^{*T}\Gamma^*_k \Delta F^* \quad (21)$$

where, $\delta^*_k = (L^T)^{-1}\delta_k$

The simplicity of the above representation derives from the fact that $\Gamma^{*k}$ is diagonal so the above can be simplified to:

$$\Delta V_k = \sum_{i=1}^{m} \delta^*_{(k)_i}\Delta F^*_i + \frac{1}{2}\sum_{i=1}^{m} \gamma^*_{(k)_{ii}}\Delta F^{*2}_i \quad (22)$$

The biggest gain from this transformed space is the $\Gamma^*$ is diagonal and the $F^*$'s are uncorrelated with zero expectation. These have major contributions in simplifying the expression of the various moments of $\Delta V$. For example expression (7) & (8) which combine to give the variance of $\Delta V$ simplifies to:

$$\text{Variance}(\Delta V_k) = \sum_{i=1}^{m} \delta^{*2}_{i(k)} + \frac{1}{4}\sum_{i=1}^{m} \gamma^{*2}_{iii(k)}(E(\Delta F^{*4}_i)-1) + \sum_{i=1}^{m} \delta^*_{i(k)}\gamma^*_{iii(k)}E(\Delta F^{*3}_i) \quad (23)$$

This essentially reduced a $O(m^4)$ expression to $O(m)$ computation.

Now, $\Delta V_P = 1^T \Delta V$ where $\Delta V$ is a vector where, 1 is a unit vector of dimension n.

We can rewrite this in the form that incorporates the unknown weights $w_k$, which we are trying to optimize.

$$\text{Variance}(\Delta V_P) = w^T \text{Variance}(\Delta V^{**}) w \quad (24)$$

where $\Delta V^{}_k = \frac{V_P}{V_K}\Delta V_k$ and $\Delta V^{}$ is a vector of $\Delta V^{**}_k$ where, w is a vector of weight $w_k$ defined earlier.

The $V_k$ in the denominator is incorporated into the $\delta$ and $\gamma$ accordingly. The cross-terms take the following shape:

$$\text{Cov}(\Delta V_k, \Delta V_j) = \quad (25)$$
$$\sum_{i=1}^{m} \delta^*_{i(k)}\delta^*_{i(j)} + \frac{1}{4}\sum_{i=1}^{m} \gamma^*_{ii(k)}\gamma^*_{ii(j)}(E(\Delta F^{*4}_i)-1) +$$
$$\frac{1}{2}\sum_{i=1}^{m} [\delta^*_{i(k)}\gamma^*_{ii(j)} + \delta^*_{i(j)}\gamma^*_{ii(k)}]E(\Delta F^{*3}_i)$$

which again just has the product of the 'm' main diagonal terms.

It is appreciated that although we have not made any distributional assumptions on $\Delta F$. However, if an assumption on normality is made then the expression for various moments simplifies and higher moments need not be stored.

In summary, the steps involved in the simplification process are outlined below.

(1) Compute Cholesky Decomposition of $\Sigma$:

$P\Sigma P^T = I$ (2) Compute:

$Q_k = (P^{-1})^T \Gamma_k (P^{-1})$ (3) Obtain the Eigenvalue Decomposition to get N:

$N^T Q_k N = \Gamma^*_k$ (4) Compute $L=N^T P$ and get $\delta^*$, $\Gamma^*$ & $\Delta F^*$, i.e., as shown in step 260 of FIG. 2.

Thereafter, in step 270 of the process of FIG. 2, the stored transforms may be used to evaluate all the risk measures.

The order of computational complexity for the Cholesky and Eigenvalue decompositions as described in Steps (1) and (3) above are quoted from Press et al., 1992, (Press et al: Numerical Recipes in C Cambridge University Press, 2nd Edn 1992), as follows:

Complexity of Cholesky decomposition is $O(m^2)$.

Complexity of Eigenvalue decomposition is $O(m^3)$.

The steps described above are pre-processing steps (FIG. 1, Step 200), which means that the problem simplification needs to be accomplished only once. Post processing (FIG. 1, either Steps 300 or 400), all moments for risk measures are simplified with an overall complexity of approximately $O(m)$, independent of the order of the moments which are estimated. Thus, all higher order moments simplify considerably, which increases efficiency.

Figure 9:
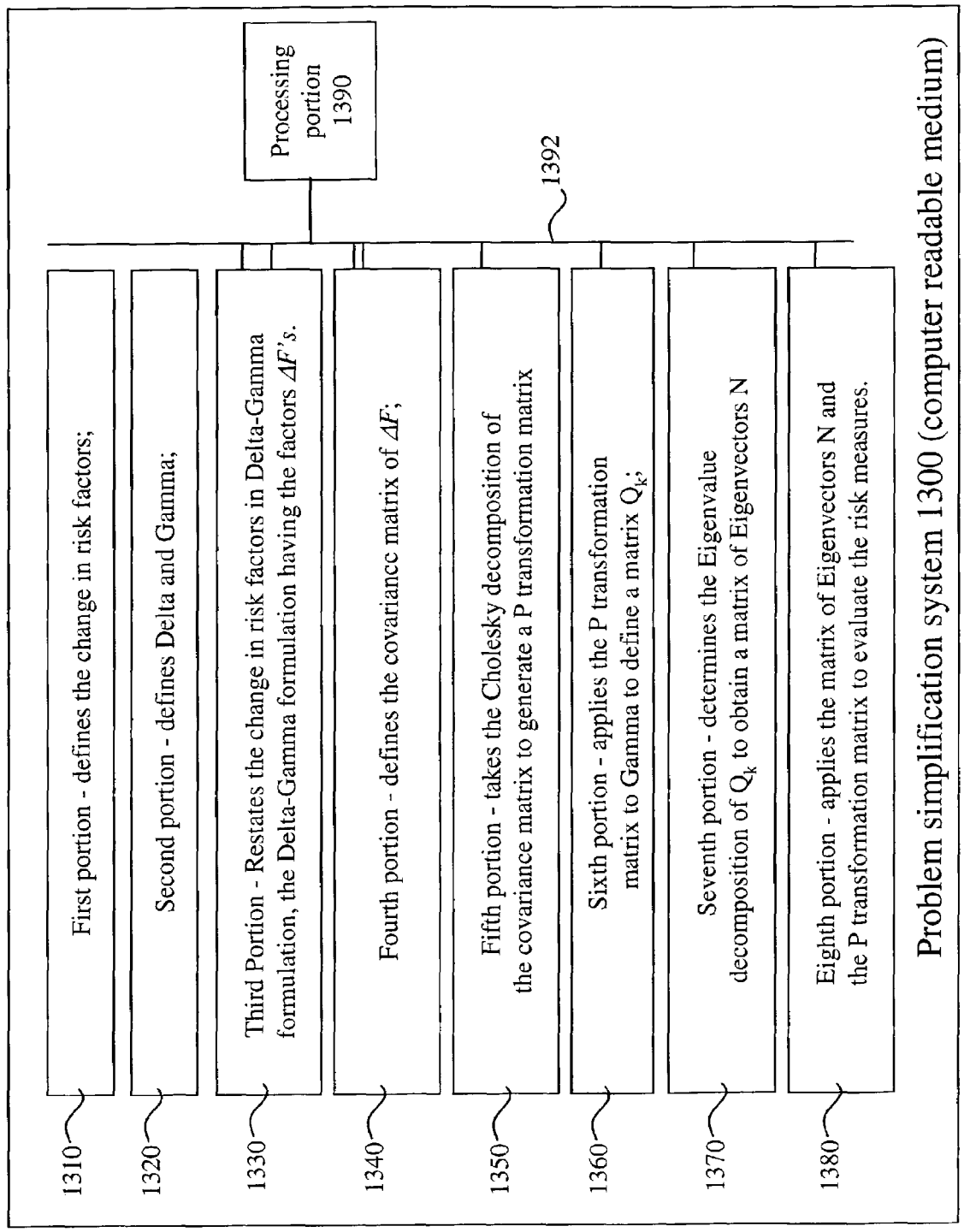
FIG. 9 is a block diagram showing a problem simplification system in accordance with one embodiment of the invention.

In accordance with one embodiment of the invention, the problem simplification method, described above, is performed using an illustrative problem simplification system 1300 as shown in FIG. 9. The problem simplification system 1300 includes components to perform the problem simplification process as described above.

The problem simplification system 1300 performs a risk measure simplification process through matrix manipulation. In this embodiment, the problem simplification system 1300 includes a first portion 1310 that defines the change in risk factors; a second portion 1320 that defines Delta and Gamma; a third portion 1330 that restates the change in risk factors in Delta-Gamma formulation, the Delta-Gamma formulation having the factors $\Delta$Fs; and a fourth portion 1340 that defines the covariance matrix of $\Delta F$. Further, the problem simplification system 1300 includes a fifth portion 1350 that takes the Cholesky decomposition of the covariance matrix to generate a P transformation matrix; a sixth portion 1360 that applies the P transformation matrix to Gamma to define a matrix $Q_k$; and a seventh portion 1370 that determines the Eigenvalue decomposition of Qk to obtain a matrix of Eigenvectors N. Additionally, the problem simplification system 1300 includes an eighth portion 1380 that applies the matrix of Eigenvectors N and the P transformation matrix to evaluate the risk measures.

The problem simplification system 1300 includes a processing portion 1390 that coordinates the processing of the various components of the problem simplification system 1300, i.e., so as to perform the features of the invention, as described above. A suitable interface 1392, i.e., such as a bus, may be used to connect the various components of the problem simplification system 1300. The problem simplification system 1300 may be in the form of a general purpose computer and/or may be disposed on a computer readable medium, for example, so as to be accessed and implemented on a general purpose computer, for example.

C. Nonlinear Programming Optimization: Using Multivariate Decision Trees

Figure 3:
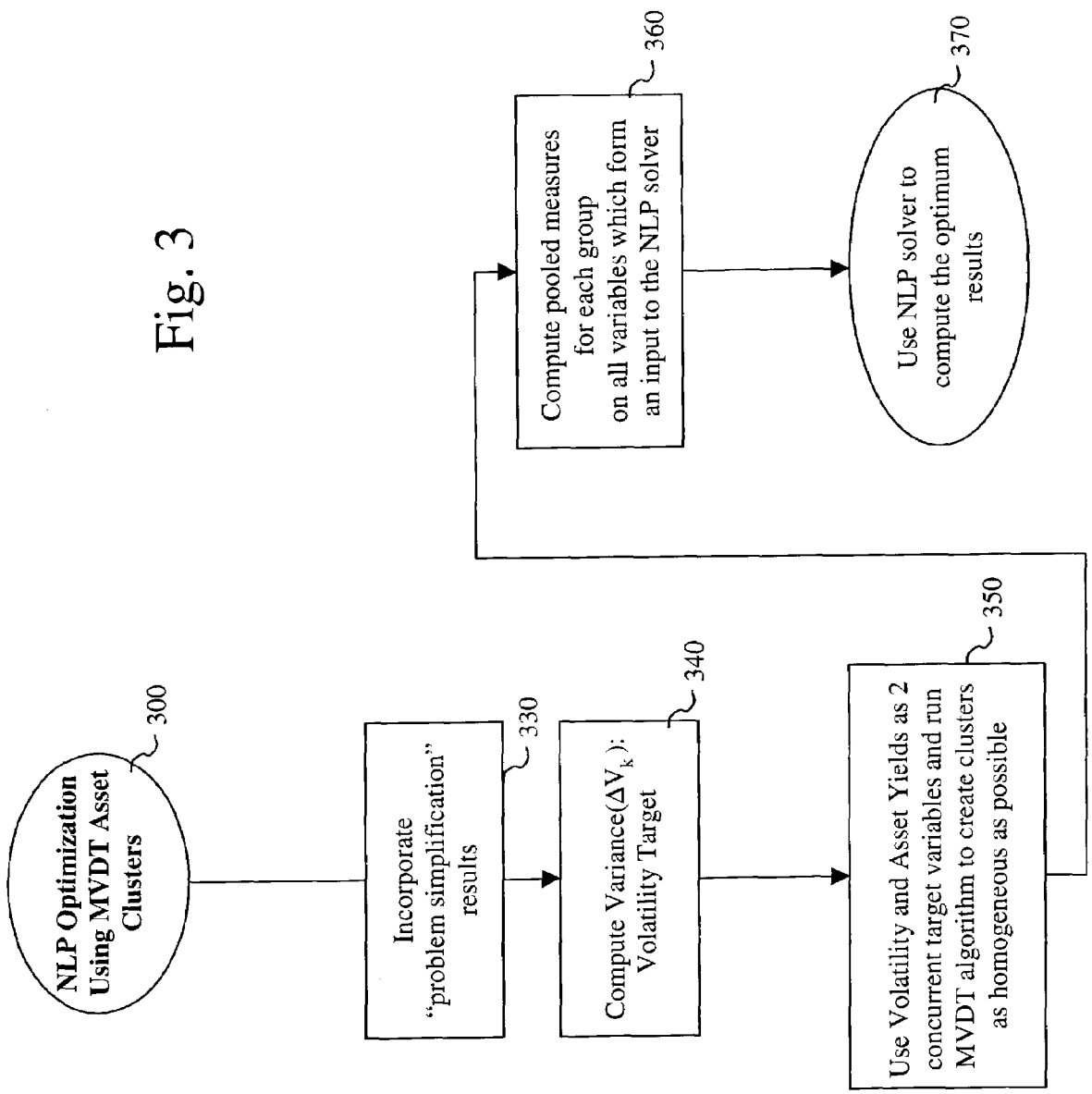
FIG. 3 is a flowchart showing the "nonlinear programming optimization using multivariate decision tree asset clusters" step of FIG. 1 in accordance with one embodiment of the invention.

Hereinafter, further aspects of the inventive technology will be described relating to step 300 of the process of FIG. 1 and the multivariate decision tree processing. FIG. 3 shows step 300 of FIG. 1 in further detail.

As described above, it is intractable for an NLP solver to handle the optimization at the security level once the number of securities exceeds a particular number. However, if we can present a grouped or pooled set of securities of the order of less than approximately 50 groups, for example, it is possible to implement the NLP approach.

The challenge here is to group the set of securities in such a fashion that each group be as homogeneous as possible with respect to the risk function being measured. In order to solve this problem we use an approach that utilizes multivariate decision trees. Specifically, one embodiment of the inventive technology uses multiple target multivariate decision trees to arrive at logical groups of the securities such that pooled measures of these can be used as proxies to original securities to serve as inputs to the NLP solver.

In accordance with one embodiment of the invention, a "volatility target" is considered. We consider the volatility measure of $\Delta V_k$ and use the expression of: Variance $(\Delta V_k)$, for each security in the existing portfolio as of today and use that as our response variable on which we want to find similarity within each group. Note that this expression is a proxy to the contribution of each security to our measure of portfolio risk since Variance $(\Delta V_p) = w^T$ Variance $(\Delta V^{**})w$. So these are the diagonal terms of the matrix, but note that $Cov(\Delta V_k, \Delta V_j) \neq 0$ (as defined in Equation 25), so the off-diagonal exists and cross-terms contribute to the ultimate risk measure.

Once the securities are grouped, pooled measures for all other variables involved in the optimization in the form of constraints is computed and those serve as inputs to the NLP optimizer.

In summary of multivariate decision trees processing, multivariate decision trees are extensions of the popular univariate classification and regression tree approach, but have more than one response variable. The application of this approach is pertinent to cases where the responses themselves co-vary with each other and hence cannot be treated separately.

However, the inventive technology provides a variation from known multivariate decision trees processing. The main change provided is to devise a matrix analog of the split criterion on which nodes are split at each level. Illustratively, we mention one commonly used analog, which is based on deviance. For any node N in the tree deviance is defined by Larsen et al. (2002) (Larsen, David R and Speckman, Paul L, "Multivariate Regression Trees for analysis of abundance data", 2002) as:

"Consider the multiple regression problem $yi=f(x_{i1}, \ldots, x_{ip})+\epsilon_i$, $i=1, \ldots, n$ where f is unknown and not easily parameterized, the $x_{ij}$ are known independent variables, and the ei are random error terms with zero means. A node N is a subset of the indices $\{1, \ldots n\}$. The deviance of a node N is defined as $$D(N) = \sum_{i \in N}(y_i - \overline{y}(N))^{2}"$$

The multivariate extension of the definition of deviance when we have 'r' response variables and 'n observations is given by Larsen et al. (2002). (Larsen, David R and Speckman, Paul L, "Multivariate Regression Trees for analysis of abundance data", 2002) as:

"Let $V_i$, $i=1, \ldots, n$, be known r×r positive definite matrices, and let $y_i = (y_{i1}, \ldots, y_{ir})^t \ldots$. Thus if $V_i$ is proportional to Variance $(y_i)$, $$D(N) = \sum_{i \in N}(y_i - \overline{y}(N))^t V_t^{-1}(y_i - \overline{y}(N))$$

is a natural definition of the deviance of node N. Note that if $V_i=V$ is a constant matrix independent of i, then $$y(N) = \frac{1}{N}\sum_{N} y_i"$$

For all practical purposes we choose $V_i$ to be equal and estimate it with the sample covariance matrix, which provides us with the known classical matrix form of Least Squares Error.

Accordingly, various aspects of the multivariate decision tree process have been described above. With further reference to FIG. 3, FIG. 3 is a flowchart showing the multivariate decision tree process in accordance with one embodiment of the invention. The process starts in step 300 and passes to step 330. In step 330, the process incorporates the "problem simplification" results from step 200 as discussed above, in accordance with one embodiment of the invention. However, it is appreciated that the problem simplification step 200 may not be needed depending on the number of asset classes, for example.

After step 330, the process passes to step 340. In step 340, the process computes the variance $(\Delta V_k)$ of a Volatility Target. Then, in step 350, the process uses the Volatility and Asset Yields as two concurrent target variables. The process runs a MVDT algorithm to create clusters as homogeneous as possible based on these two concurrent target variables.

Then, in step 360, the process computes the pooled measures for each group, i.e., on all variables which form an input to the NLP solver, which is used. After step 360, in step 370, the process implements an NLP solver to compute optimum results, as is desired.

Figure 10:
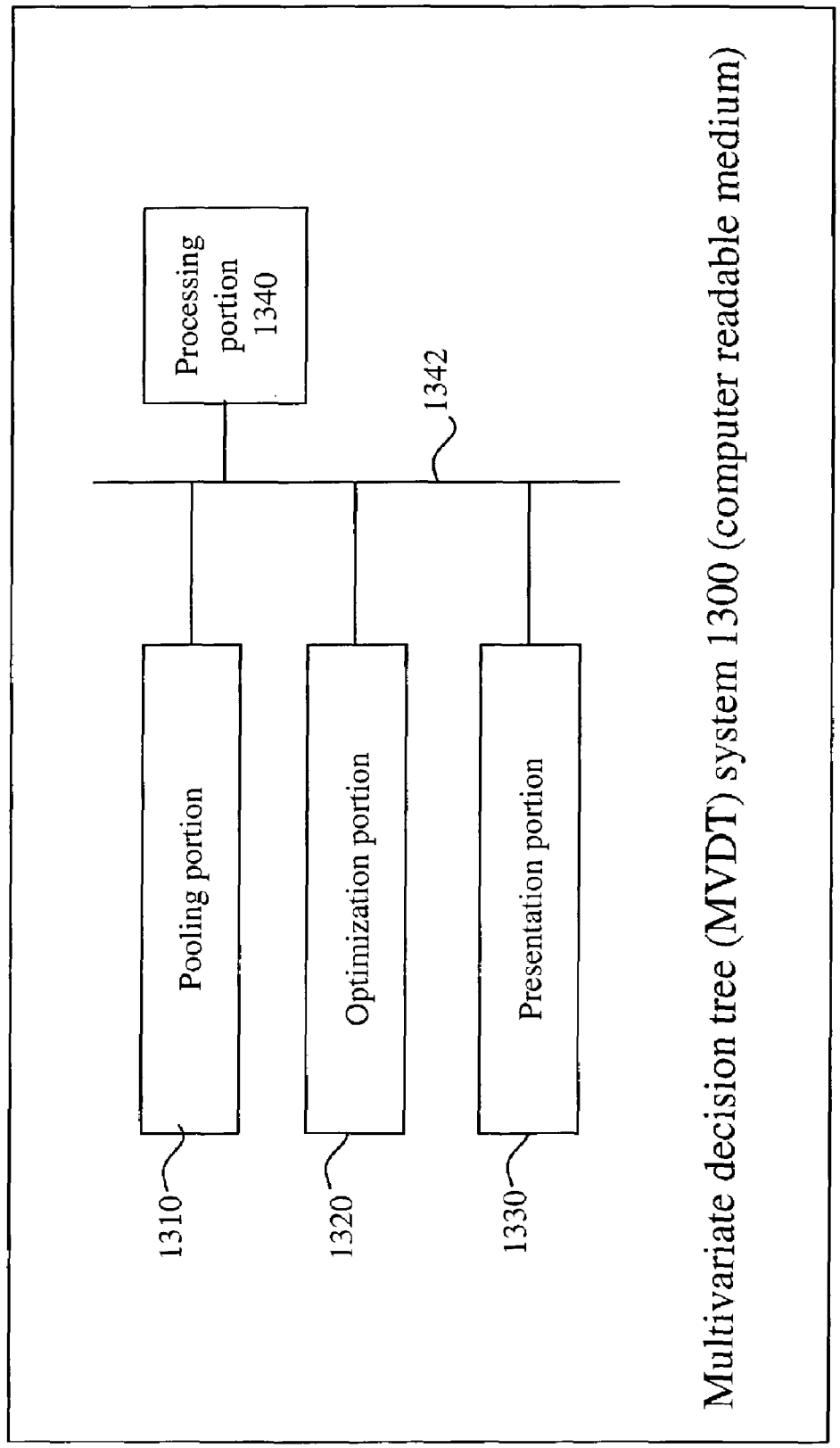
FIG. 10 is a block diagram showing a multivariate decision tree (MVDT) system in accordance with one embodiment of the invention.

It should be appreciated that the above method for performing nonlinear programming optimization using multivariate decision trees may be performed by a variety of operating systems. Illustratively, FIG. 10 is a block diagram showing a multivariate decision tree system 1340.

The multivariate decision tree system 1340 includes a pooling portion 1310, an optimization portion 1320, and a presentation portion 1330. The multivariate decision tree system 1340 may assist in determining the allocation of securities in a portfolio, as described above. The system may input asset data 110 that provides a collection of securities in a portfolio, each security being associated with associated attributes. Further, the multivariate decision tree system 1340 may input risk factor data 100 that provides risk factor data related to the portfolio. The pooling portion 1310 pools the securities into a plurality of security clusters based on the attributes associated with each security and the risk factor data, each security being assigned to a security cluster. The pooling is performed using multivariate decision tree processing. Further, the optimization portion 1320 processes the security clusters using a nonlinear programming optimizer to generate optimization results. Further, the presentation portion 1330 presents the optimization results in a risk-return space for determination of a security allocation in a desired manner, i.e., such as on a monitor.

The multivariate decision tree system 1340 includes a processing portion 1340 that coordinates the processing of the various components of the multivariate decision tree system 1340, i.e., so as to perform the features of the invention, as described above. A suitable interface 1342, i.e., such as a bus, may be used to connect the various components of the multivariate decision tree system 1340. The multivariate decision tree system 1340 may be in the form of a general purpose computer and/or may be disposed on a computer readable medium, for example, so as to be accessed and implemented on a general purpose computer, for example.

D. The Sequential Linear Programming (SLP) Process

In accordance with further embodiments of the inventive technology, a sequential linear programming (SLP) technique may be used in place of the multivariate decision tree processing. In this approach, we are able to deal with the full decision space. That is, there is no dimension reduction in the securities space. As described above, in a portfolio optimization problem, there are typically non-linear functions f. These non-linear functions are typically be related to risk, but could also arise from other sources. In accordance with this embodiment of the invention, the technique provides for the nonlinear functions f to be transformed into constraints. In general, it should be appreciated that non-linear constraints would result in an intractable problem. As a result, the invention provides for a sequence of proxy constraints which are linear. These constraints are used to obtain the efficient frontier between the multiple objectives of the problem.

The inventors have used sequential linear programming for testing problems with nonlinear, but convex constraints, by first relaxing the problem and eliminating the nonlinear constraints, and then successively building a set of linear constraints that approximate each nonlinear constraint in the region of the optimal solutions along the efficient frontier.

Figure 4:
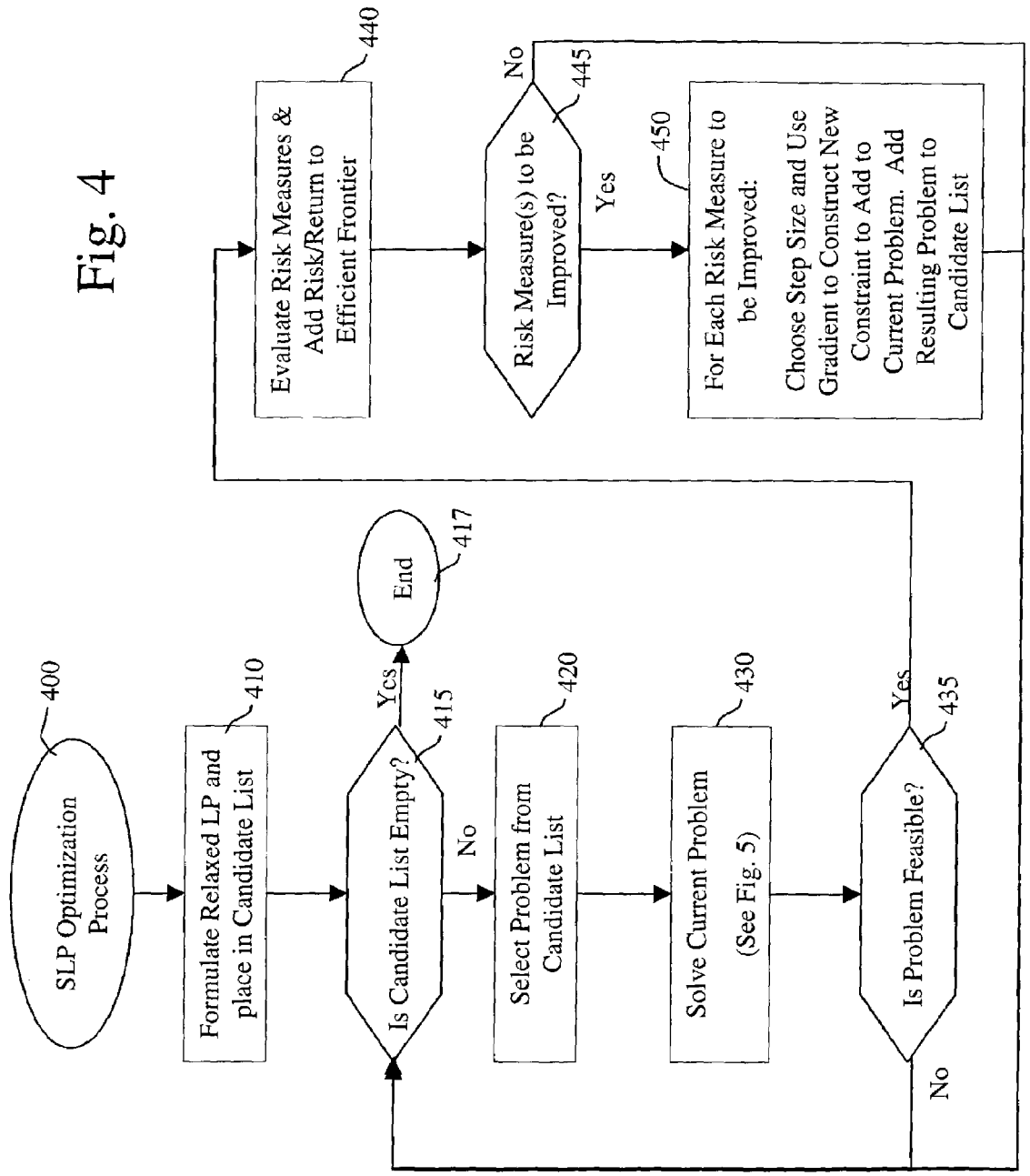
FIG. 4 is a flowchart showing the "sequential linear programming (SLP) optimization process" step of FIG. 1 in accordance with one embodiment of the invention.

As described above, the SLP optimization step 400 of FIG. 1 may be applied in lieu of the multivariate decision tree processing. FIG. 4 is a flowchart showing step 400 in further detail, in accordance with one embodiment of the invention. As shown in FIG. 4, the method starts in step 400 and passes to step 410.

In step 410, the process formulates a relaxed linear programming problem that does not include any of the nonlinear measures. This problem is entered into a set of candidate problems in step 410, where, initially, it is the only candidate problem. After step 410, the process passes to step 415. In step 415, the process determines whether the candidate list is empty. If the candidate list is empty in step 415, the process passes to step 417 and the process ends. If the candidate list is not empty in step 415, then the process passes to step 420. In step 420, any problem is randomly selected from the candidate list, and is designated the current problem.

Figure 5:
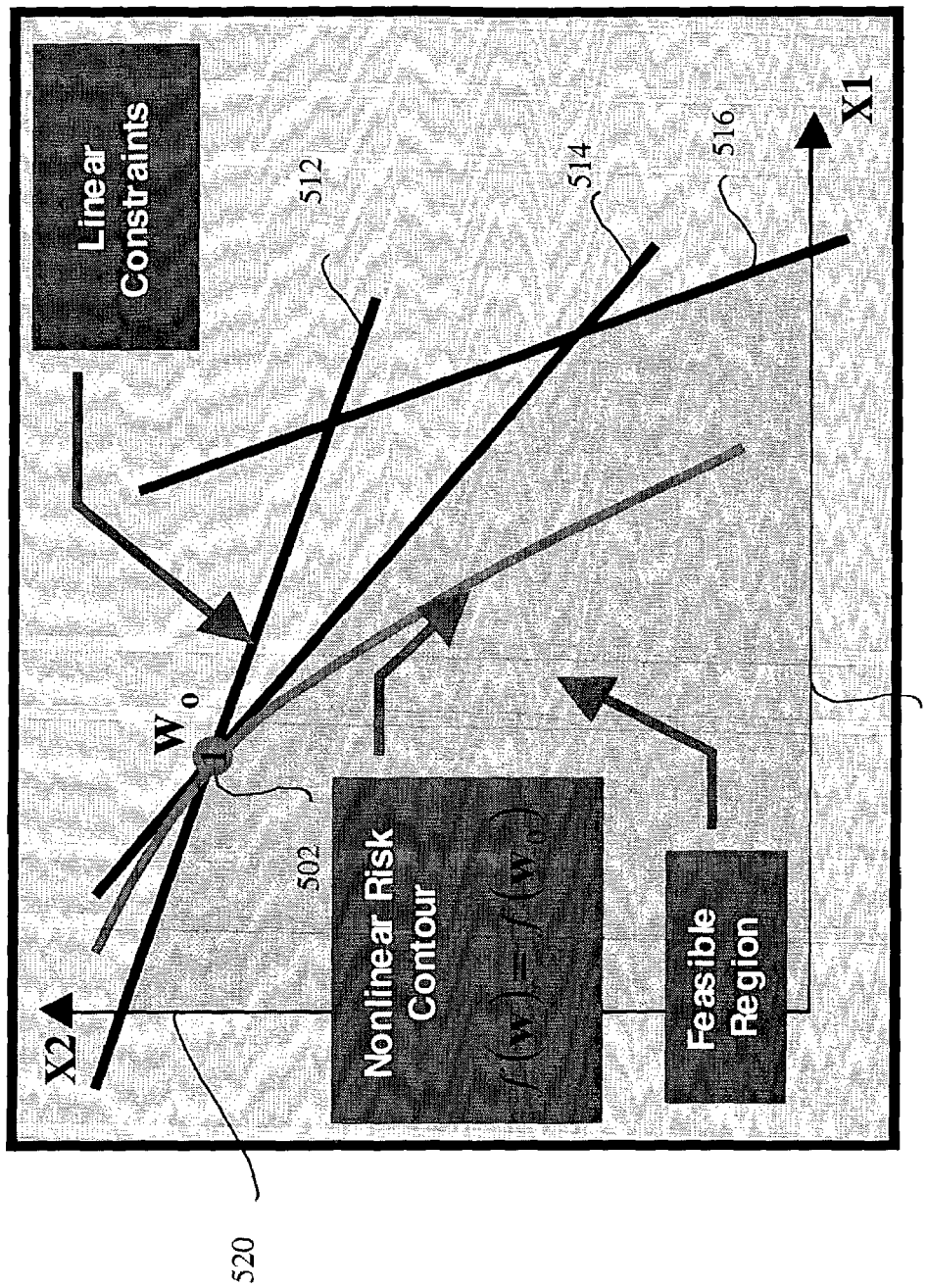
FIG. 5 is a diagram showing aspects of the initialization of the SLP process by solving a constrained relaxed LP problem.

This problem is then solved in step 430 to obtain a current portfolio, i.e., the optimal collection of securities for the current set of constraints. FIG. 5 illustrates the first such point, $w_o$, i.e., the point 502. FIG. 5 also shows a plurality of linear constraints that go to form a feasible region (512, 514, 516, 518, and 520). If the problem is not feasible, then another candidate problem must be selected. That is, the process passes from step 435 back to step 415. For example, the problem will not be feasible if the plurality of constraints do not form a feasible region, which could eventually occur if it is attempted to reduce a risk measure too far.

Figure 7:
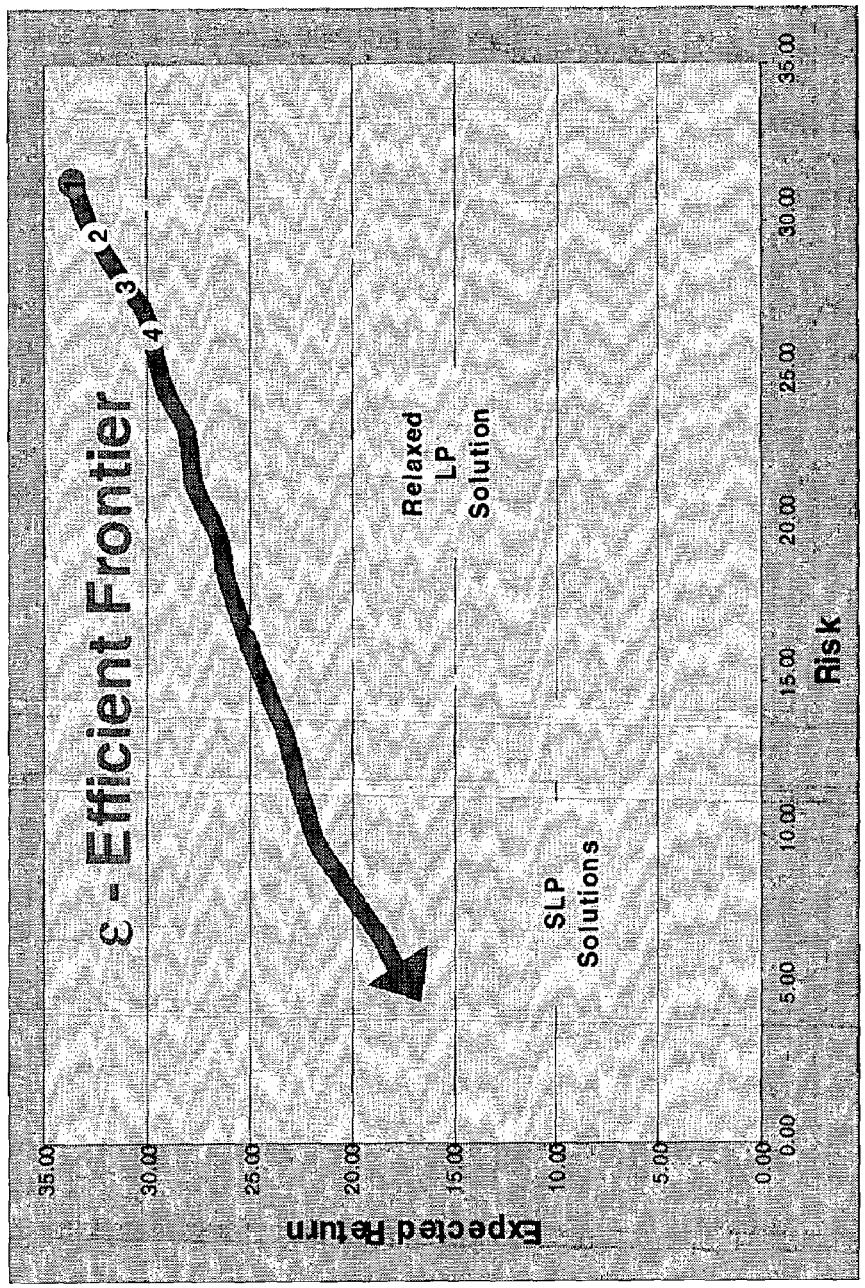
FIG. 7 is a diagram showing aspects of the calculated risk value versus return in accordance with one embodiment of the invention.

If the problem is feasible, then, the process passes from step 435 to step 440. In step 440, the nonlinear measures are evaluated at the optimal point, yielding a point on the efficient frontier in the risk/return space. For example, several such points are shown in FIG. 7.

After step 440, the process of FIG. 4 passes to step 445. In step 445, a determination is made whether it is desired to improve any of the risk measures. For example, in accordance with one embodiment of the invention, a desired lower bound could be provided to the process. Alternatively, the SLP process could continue to improve each risk measure until the problems fail at step 435. If yes in step 445, then the process passes to step 450.

In step 450, for each risk measure to be improved, the desired granularity of the efficient frontier is used to determine a step size, and the process uses the gradient of the nonlinear measure, together with the step size, to add a constraint to the current problem, creating a new problem, which is added to the candidate list. To determine the step size, one could simply use a small value that is granular relative to the nonlinear function value at the current solution. For example, the current value of the nonlinear function is 10,000. The step size can be determined at 10. This simple method would require a large number of iterations, which is computationally intensive. One can improve the computational efficiency with step size determination methods. The improved method calculates the distance between the current nonlinear function value (i.e. risk level) and the target value (i.e. minimum risk value). The preliminary step size is given by the distance divided by the desired number of steps. Then, the preliminary step size is adjusted with information obtained by testing the terrain around the current solution, in accordance with one embodiment of the invention.

Figure 6:
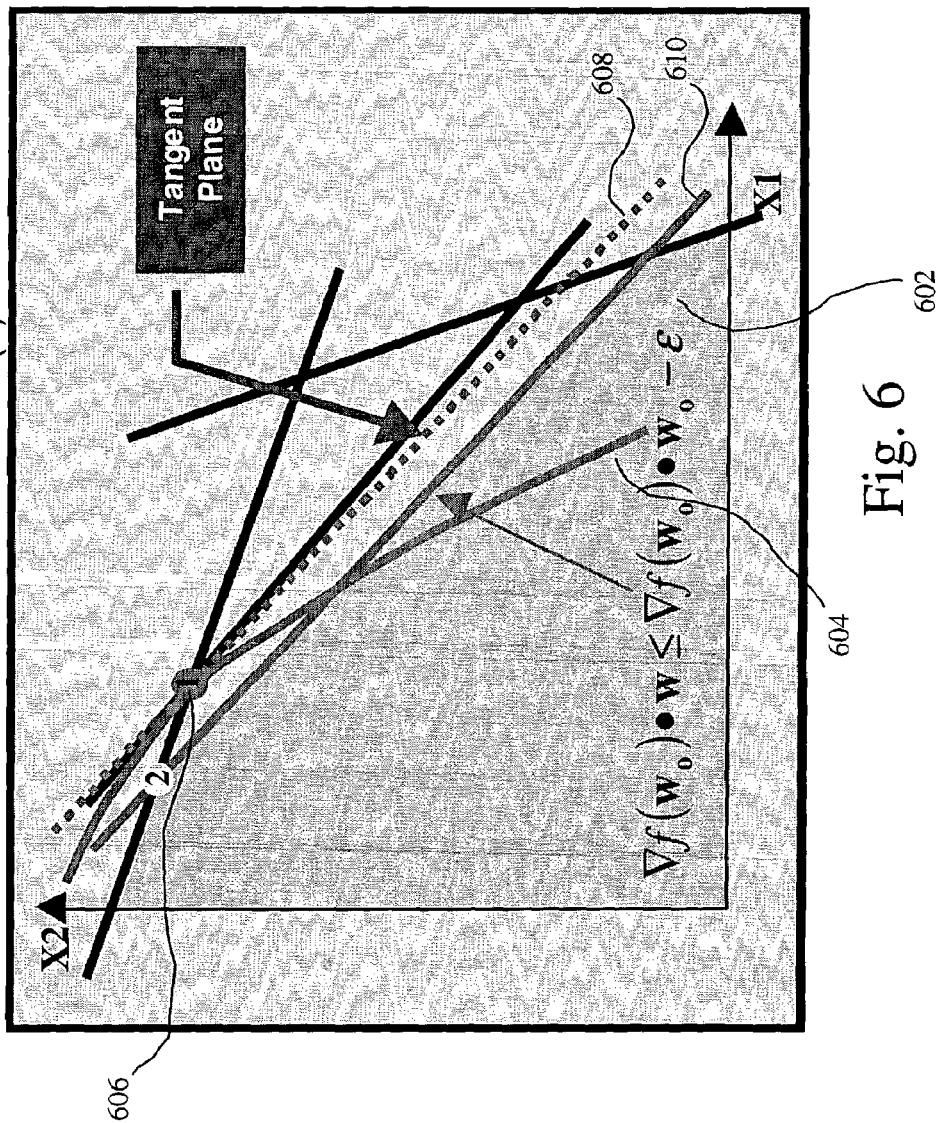
FIG. 6 is a diagram showing aspects of an iteration of the SLP process by calculating the tangent plane to the nonlinear risk function, adding a new constraint by adjusting the tangent plane by the step size $\epsilon$, and solving the resulting problem to obtain a new solution.

This process is illustrated in FIG. 6. From this point, the process returns to step 415, and, if there is at least one problem in the candidate list, the process is repeated from that point. One could, of course, add more than one such constraint to a single problem. And, indeed, if there are a large number of risk measures—and three could constitute a large number if the desired granularity of the efficient frontier is small—it would be advisable to add constraints corresponding to risk measures, until one moves to a corner of the efficient frontier that we actually care about. Although one may choose to add multiple constraints at once, but we should ensure that the overall step size is small enough to preserve optimality. The step size when adding multiple constraints may be the square root of the sum of the squares of the individual step sizes. One may quickly travel to the region of interest either by adding a single constraint or multiple constraints at a time. This can be done by always picking the candidate problem that brings one closest to the region of interest from the set of candidate problems to work on. Once in the region of interest we can purge all the candidate problems that are outside this region from the set of candidate problems.

FIG. 6 shows aspects of an iteration of the SLP process of FIG. 4. In this example, FIG. 6 shows that the feasible region 602 of the relaxed linear program lies below and to the left of the constraints. The curve 604 represents the contour of the nonlinear risk measure that passes through the optimal solution 606 to the relaxed LP. The process determines a tangent plane 608 at the optimal solution, and uses the tangent plane 610 as a new constraint, i.e., after shifting the tangent plane from line 608. That is, the line 610 is the new constraint that is added, parallel to the plane 608, but moved a distance $\epsilon$ toward a lower-risk solution.

If the nonlinear contours are locally convex in the region of interest, the SLP process as described above will define the efficient frontier. In general, risk contours are likely to be convex in the range of interest. As long as the step size is sufficiently small, one can easily check to see if the nonlinear function is convex in the region of interest. When the risk measures are evaluated for the new solution, if $f_j(w_i) < f_j(w_{i-1}) - \epsilon$, then the function is not convex. In this case, it may be useful to reduce step size.

FIG. 7 is a graph illustrating solutions provided by the SLP process in a two dimensional space by solving a trade-off problem between one return and one risk measure. FIG. 8 is a graph showing a three dimensional efficient frontier provided by the SLP process described above. As shown in FIG. 8, two risks are included in the analysis, i.e., risk 1 and risk 2. The two risks are plotted against return. It should of course be appreciated that more than two risks may well be used, but that such does not readily lend itself to graphical representation. However, such additional risks may of course be shown mathematically so as to result in an efficient frontier, as described above.

Figure 11:
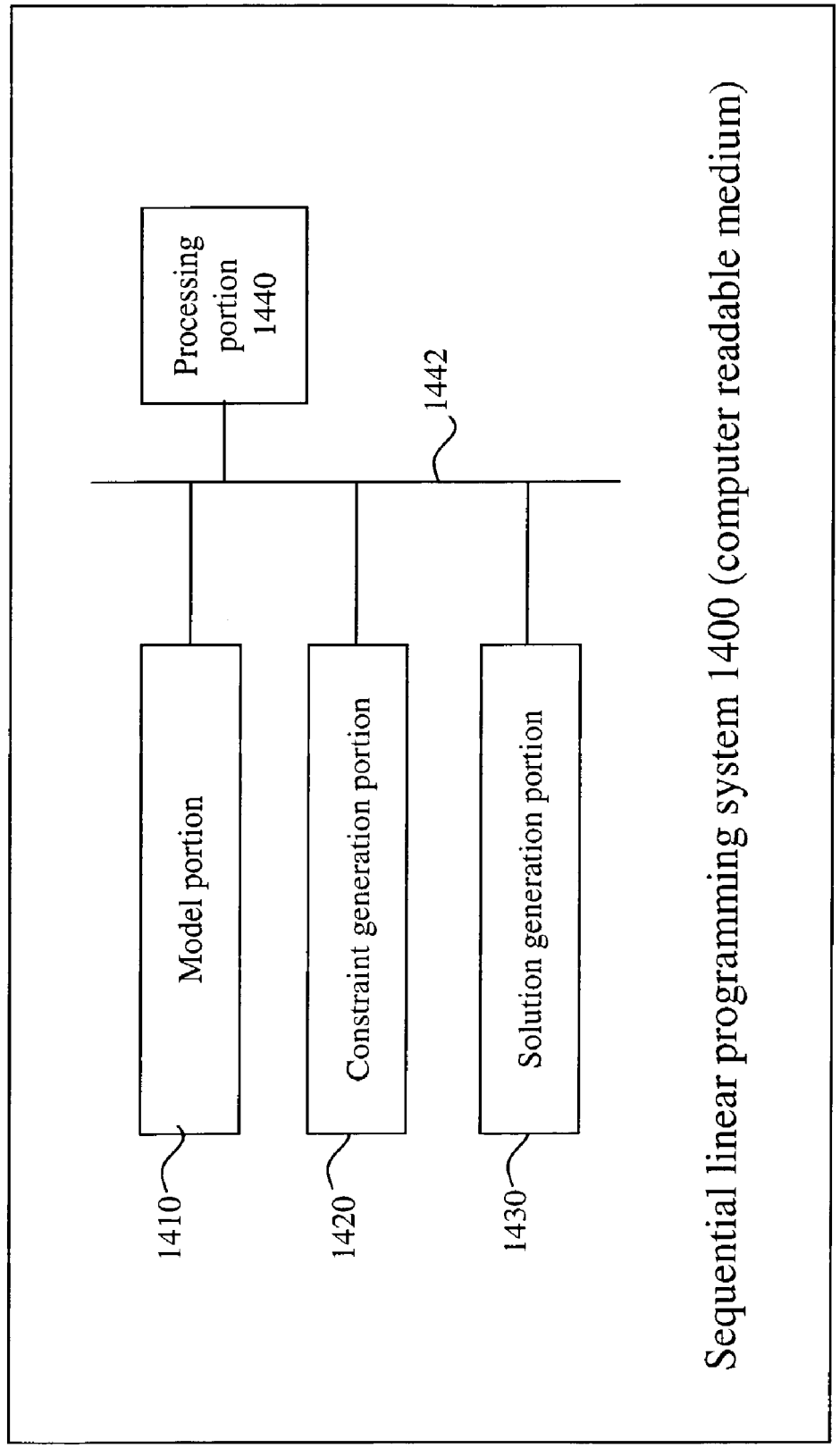
FIG. 11 is a block diagram showing a sequential linear programming system in accordance with one embodiment of the invention.

It should be appreciated that the above method for providing an efficient frontier using sequential linear programming (SLP) may be performed by a variety of operating systems. Illustratively, FIG. 11 is a block diagram showing a sequential linear programming system 1440. The sequential linear programming system 1440 determines an efficient frontier, which comprises a collection of allocations in a portfolio, in a situation with multiple, conflicting objectives in a multi-factor portfolio problem. The sequential linear programming system 1440 includes a model portion 1410, a constraint generation portion 1420 and a solution generation portion 1430, which may be used to practice the invention as described above. For example, the model portion 1410 may provide a mathematical model of a relaxation of a problem. The constraint generation portion 1420 generates a sequence of additional constraints. Further, the solution generation portion 1430 sequentially applies respective nonlinear risk functions to generate respective adjusted maximum return solutions to obtain an efficient frontier, in accordance with one embodiment of the invention.

The sequential linear programming system 1440 includes a processing portion 1440 that coordinates the processing of the various components of the sequential linear programming system 1440, i.e., so as to perform the features of the invention, as described above. A suitable interface 1442, i.e., such as a bus, may be used to connect the various components of the sequential linear programming system 1440. The sequential linear programming system 1440 may be in the form of a general purpose computer and/or may be disposed on a computer readable medium, for example, so as to be accessed and implemented on a general purpose computer, for example.

E. Further Aspects of the Invention

The analytical-based multiple risk factor optimization approach uses analytical forms for the calculation of risk measures. The proposed approach uses not only risk measures that capture risk caused by the variation of the portfolio value around mean, measured by the variance or standard deviation, but also additional information about the distribution of the portfolio value. Skewness and Value at Risk (VAR) are additional risk measures that can be used to control the portfolio downside risk.

In comparison to simulation techniques, the analytical approach trades small loss in accuracy with large gain in speed. This approach yields an optimal solution or a set of optimal solutions on the efficient frontier much faster than the simulation approach.

For typical ALM optimization problems, which cannot be solved by a NLP optimizer due to large number of assets in the portfolio, the SLP algorithm overcomes the computational hurdle by solving the nonlinear problem with an LP optimizer. The SLP algorithm efficiently finds optimal (or $\epsilon$-optimal) solutions to a class of nonlinear optimization problems with minimal computational effort. In the case of convexity, optimality is guaranteed. In the case of non-convexity, we provide a method for ensuring a good, fast solution.

Various advantages are provided by embodiments of the invention. The analytical-based optimization with the SLP algorithm provides a breakthrough for solving ALM optimization problems. The proposed approach overcomes the hurdle faced by the classical Markowitz portfolio optimization and traditional ALM approaches. Typical ALM portfolio management requires solving the optimization problems at the asset rather than asset class levels. This kind of optimization problem exceeds the practical limit of a NLP optimizer.

Further, the SLP algorithm provides a better solution than the methods currently in use. Today, a traditional optimization approach is widely used for solving ALM optimization problems. The approach solves for an optimal solution by controlling mismatches between asset- and liability-duration and convexity. A trial and error method is used to obtain an improved solution by adjusting the constraints on key rate duration mismatches. Essentially, this approach yields a suboptimal solution since the portfolio manager losses sight of the portfolio total risk.

Without this invention, portfolio optimization can only be done at the coarsest possible level of granulation, or must rely on linear estimates of portfolio risk, which are incomplete. Solution approaches are computationally intensive, and generally still rely heavily on the experience of the users to tweak them into usable form.

In addition to efficiency improvement (better solution), the analytical-based optimizer provides significant improvement on speed over the simulation approach. In a portfolio optimization context, the multi-objective optimization based on multiple risk measures provides efficient portfolios in a three dimensional space. A second risk measure, for example Value at Risk (VaR), is added into the risk/return trade-off space. The new chart provides portfolio managers a view on the surface of efficient frontier that results from the trade-off between a return measure and two risk measures. In essence, it provides also a trade-off between two risk measures. In other words, a portfolio manager who wants to minimize the tail risk may have to assume more variance risk. Various other advantages are provided by the invention.

Hereinafter, general aspects of possible implementation of the inventive technology will be described. Various embodiments of the inventive technology are described above. In particular, FIGS. 1-4 show various steps of embodiments of processes of the inventive technology. FIGS. 9-11 show illustrative operating systems. It is appreciated that the systems of the invention or portions of the systems of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above in the flowcharts. Such a set of instructions for performing a particular task may be characterized as a program, software program, or simply software.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including a microcomputer, mini-computer or mainframe for example, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the various embodiments of the inventions.

It is appreciated that in order to practice the method of the invention as described above, it is not necessary that the processors and/or the memories of the processing machine be physically located in the same geographical place. That is, each of the processors and the memories used in the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing as described above is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, or any client server system that provides communication, for example. Such communications technologies may use any suitable protocol such as TCP/IP, UDP, or OSI, for example.

As described above, a set of instructions is used in the processing of the invention. The set of instructions may be in the form of a program or software. The software may be in the form of system software or application software, for example. The software might also be in the form of a collection of separate programs, a program module within a larger program, or a portion of a program module, for example The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in or used by the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for determining the allocation of securities in a portfolio, the method comprising:
    performing multivariate decision tree processing on a collection of securities in a portfolio using at least two concurrent target variables comprising a plurality of risk measures and at least one return measure, the plurality of risk measures including variance, skewness and Value at Risk, and pooling each security into a plurality of substantially homogeneous security clusters based on the target variables using a processor of a computing device;
    determining pooled measures for each substantially homogeneous cluster, the pooled measures serving as proxies to each security in the portfolio, the pooled measures serving as inputs to the multivariate decision tree processing using the processor of the computing device;
    processing the plurality of substantially homogeneous security clusters using a nonlinear programming optimizer to generate optimization results using the processor of the computing device; and
    presenting the optimization results in a risk-return space for determination of a security allocation using the processor of the computing device.

2. The method of claim 1, wherein the pooled measures serve as constraints in the nonlinear programming optimizer.

3. The method of claim 1, further including decomposing the securities, before pooling the securities into a plurality of security clusters, into respective subsets of securities, and performing multivariate decision tree processing on each subset.

4. The method of claim 1, wherein the risk factor data is associated with risk measures, the method further including performing a risk measure simplification process though matrix manipulation comprising:
    defining the change in risk factors;
    defining Delta and Gamma;
    restating the change in risk factors in Delta-Gamma formulation, the Delta-Gamma formulation having the factors $\Delta F$'s;
    defining the covariance matrix of $\Delta F$;
    taking the Cholesky decomposition of the covariance matrix to generate a P transformation matrix;
    applying the P transformation matrix to Gamma to define a matrix $Q_k$;
    determining the Eigenvalue decomposition of $Q_k$ to obtain a matrix of Eigenvectors N; and
    applying the matrix of Eigenvectors N and the P transformation matrix to evaluate the risk measures.

5. The method of claim 1, the portfolio is a collection of securities, which includes at least one of assets and liabilities.

6. A system for determining the allocation of securities in a portfolio, the system represented as a computer program tangibly embodied on a computer readable medium and executed by a computing device, comprising:

a security attribute portion, being at least one of an asset data portion and a liability data portion, containing attributes associated with a collection of securities in a portfolio;

a risk factor data portion that provides risk factor data related to securities in the portfolio;

a pooling portion that performs multivariate decision tree processing on the collection of securities in the portfolio using at least two target variables comprising a plurality of risk measures and at least one return measure the plurality of risk measures including variance, skewness and Value at Risk, pools each security into a plurality of substantially homogeneous security clusters based on the target variables, and determines pooled measures for each substantially homogeneous cluster, the pooled measures serving as proxies to each security in the portfolio, the pooled measures serving as inputs to the multivariate decision tree processing;

an optimization portion that processes the plurality of substantially homogeneous security clusters using a nonlinear programming optimizer to generate optimization results; and a presentation portion that presents the optimization results in a risk-return space for determination of a security allocation.

7. The system of claim 6, wherein security attributes and the risk factor data provide a risk measure and a return measure for each security, the risk measure of each security and the return measure of each security being used as target variables in the multivariate decision tree processing.

8. The system of claim 7, wherein a first target is volatility and a second target is security return.

9. The system of claim 7, wherein the pooling portion decomposes the securities, before pooling the securities into a plurality of security clusters, into respective subsets of securities, each subset then being subject to multivariate decision tree processing.

10. An article of manufacturing for determining the allocation of securities in a portfolio, the article of manufacturing comprising:

a computer readable medium tangibly embodying a computer program executable by a processor of a computer, wherein the computer program contains:

a first portion containing attributes associated with a collection of securities in a portfolio;

a second portion that provides risk factor data related to securities in the portfolio;

a third portion that performs multivariate decision tree processing on the collection of securities in the portfolio using at least two concurrent target variables comprising a plurality of risk measures and at least one return measure the plurality of risk measures including variance, skewness and Value at Risk, pools each security into a plurality of substantially homogeneous security clusters based on the target variables, and determines pooled measures for each substantially homogeneous cluster, the pooled measures serving as proxies to each security in the portfolio, the pooled measures serving as inputs to the multivariate decision tree processing;

a fifth portion that processes the plurality of substantially homogeneous security clusters using a nonlinear programming optimizer to generate optimization results; and a sixth portion that presents the optimization results in a risk-return space for determination of a security allocation.

\* \* \* \* \*

UNITED STATES PATENT AND TRADEMARK OFFICE
CERTIFICATE OF CORRECTION

| | | |
|---|---|---|
| PATENT NO. | : 7,640,201 B2 | Page 1 of 1 |
| APPLICATION NO. | : 10/390710 | |
| DATED | : December 29, 2009 | |
| INVENTOR(S) | : Chalermkraivuth et al. | |

It is certified that error appears in the above-identified patent and that said Letters Patent is hereby corrected as shown below:

On Page 3, in Item (56), under "OTHER PUBLICATIONS", in Column 1, Line 19, delete "De ath," and insert -- De'ath, --, therefor.

In Column 3, Line 58, delete "invention; and" and insert -- invention. --, therefor.

In Column 5, Line 66, delete "$\partial V_i/\partial F_i$" and insert -- $\partial V_k/\partial F_i$ --, therefor.

In Column 8, Line 57, delete "l(w)=C." and insert -- l(w)=c, --, therefor.

In Column 11, Line 64, after "$P\Sigma P^T=I$" insert -- . --.

In Column 24, Line 45, in Claim 4, delete "though" and insert -- through --, therefor.

In Column 25, Line 10, in Claim 6, delete "measure" and insert -- measure, --, therefor.

In Column 26, Lines 17-18, in Claim 10, delete "measure" and insert -- measure, --, therefor.

Signed and Sealed this

Eighth Day of June, 2010

David J. Kappos
*Director of the United States Patent and Trademark Office*

UNITED STATES PATENT AND TRADEMARK OFFICE
CERTIFICATE OF CORRECTION

PATENT NO.        : 7,640,201 B2                                                   Page 1 of 1
APPLICATION NO. : 10/390710
DATED             : December 29, 2009
INVENTOR(S)       : Chalermkraivuth et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1711 days.

Signed and Sealed this

Ninth Day of November, 2010

David J. Kappos
*Director of the United States Patent and Trademark Office*